US011640475B1

(12) United States Patent
Della Maggiora et al.

(10) Patent No.: US 11,640,475 B1
(45) Date of Patent: May 2, 2023

(54) SYSTEMS AND PROCESSES FOR PROVIDING SECURE CLIENT CONTROLLED AND MANAGED EXCHANGE OF DATA BETWEEN PARTIES

(71) Applicant: GOBEEP, INC., Greenville, SC (US)

(72) Inventors: Paul Della Maggiora, Greenville, SC (US); David Olds, Woodstock, GA (US)

(73) Assignee: GoBeep, Inc., Greenville, SC (US)

( * ) Notice: Subject to any disclaimer, the term of this patent is extended or adjusted under 35 U.S.C. 154(b) by 408 days.

(21) Appl. No.: 17/104,266

(22) Filed: Nov. 25, 2020

Related U.S. Application Data

(60) Provisional application No. 62/940,466, filed on Nov. 26, 2019.

(51) Int. Cl.
| | |
|---|---|
| *G06F 21/62* | (2013.01) |
| *H04L 9/08* | (2006.01) |
| *G06F 21/64* | (2013.01) |

(52) U.S. Cl.
CPC .......... *G06F 21/6218* (2013.01); *G06F 21/64* (2013.01); *H04L 9/0825* (2013.01)

(58) Field of Classification Search
CPC ..... G06F 21/6218; G06F 21/64; H04L 9/0825
See application file for complete search history.

(56) References Cited

U.S. PATENT DOCUMENTS

| | | | | |
|---|---|---|---|---|
| 9,830,278 | B1* | 11/2017 | Harwood | H04L 63/061 |
| 10,425,426 | B1* | 9/2019 | Simons | H04L 9/3226 |
| 11,481,511 | B2* | 10/2022 | Amar | H04L 9/3247 |
| 2007/0005964 | A1* | 1/2007 | Grosse | H04L 63/083 |
| | | | | 713/168 |
| 2009/0138700 | A1* | 5/2009 | Miyazaki | H04L 9/0894 |
| | | | | 707/E17.014 |
| 2014/0189355 | A1* | 7/2014 | Hunter | H04L 63/0428 |
| | | | | 713/171 |
| 2016/0352705 | A1* | 12/2016 | Lockhart | H04L 63/061 |
| 2017/0141926 | A1* | 5/2017 | Xu | H04L 63/12 |
| 2020/0028836 | A1* | 1/2020 | Gandhi | H04L 63/062 |
| 2021/0083873 | A1* | 3/2021 | Harris | H04L 63/0807 |

\* cited by examiner

*Primary Examiner* — Han Yang
(74) *Attorney, Agent, or Firm* — Morris, Manning & Martin, LLP; Daniel E. Sineway, Esq.; Micah B. Hensley, Esq.

(57) ABSTRACT

In various embodiments, once the client registers onto the system, a third party (a "requestor") may transmit a request to the client for the client to provide the requestor with access to the client data. In at least one embodiment, a requestor may be an entity or person that desires to utilize client data for the requestor's business purposes. In one embodiment, upon registration with the application, the system generates and assigns the requestor a requestor key. In one or more embodiments, the system transmits the requestor key along with each requestor request. In some embodiments, the client may accept or reject the requestor's request. In many embodiments, if the client accepts the requestor's request, the system grants the requestor access to the client data.

18 Claims, 16 Drawing Sheets

SYSTEMS AND PROCESSES FOR PROVIDING SECURE CLIENT CONTROLLED AND MANAGED EXCHANGE OF DATA BETWEEN PARTIES

CROSS REFERENCE TO RELATED APPLICATIONS

This application claims the benefit of, and priority to, U.S. Provisional Patent Application. No. 62/940,466, filed on Nov. 26, 2019, and entitled "A METHOD FOR PROVIDING CLIENT CONTROLLED AND MANAED SECURE EXCHANGE OF DATA BETWEEN PARTIES," the disclosure of which is incorporated by reference herein in its entirety.

TECHNICAL FIELD

The present systems and methods relate generally to consumer information management, and more particularly to the use of software, hardware, and related systems to receive or generate personal consumer information, exchange and manage information with merchants, and remove produced information from merchant systems.

BACKGROUND

Corporations around the globe harvest, buy, and sell client personal data every day, and clients have little control and visibility over what happens to their personal data once a company has control of the personal data. Companies apply broad usage agreements that grant wide access to collect and use client personal data in exchange for using the company's services.

Recent exposures of personal data collection, data breaches, and wide-spread distribution of client personal data have exposed the lack of control clients have to control which companies get access to specific personal data, as well as a distinct lack of control for a client to revoke that personal data once shared. Governments around the world have begun legislating to protect personal data and shift the liability to businesses for the safe and legal handling of that personal data. Some current privacy legislation states that a consumer's request to a business to revoke the consumer's personal information must be honored, and the business must prove that the business honored the request. However, the current legislations do little to empower a client to control their own personal data once it has been exchanged with a company. If a consumer shares personal information with a business and subsequently changes his or her mind, revocation of the personal information occurs as a matter of trust because the consumer cannot know that the business deleted or removed the consumer's personal information.

Therefore, there is a long-felt but unresolved need for a system or method that allows a client to control the client's personal information and other client-specific data.

BRIEF SUMMARY OF THE DISCLOSURE

Briefly described, and according to one embodiment, aspects of the present disclosure generally relate to systems and methods for the use of software, hardware, and related systems to receive or generate personal consumer information, exchange and manage information with merchants, and remove produced information from merchant systems.

In multiple embodiments, the disclosed system allows a client to control a third party's usage of the client's personal information and other client-specific data. For example, in one embodiment, a client may be a consumer of a retail merchant, and the merchant, though the disclosed system, may request the consumer's information, including product preferences and consumer personal information. Continuing with the example, in one embodiment, in exchange for the consumer's information, the merchant may offer the consumer early access to particular products, discount codes, and/or other marketing experiences. In many embodiments, the consumer may accept the merchant's request, allowing the merchant access to the consumer's information on the client's application. In some embodiments, the relationship between the consumer and the merchant is logged onto a distributed ledger, thereby allowing both the consumer and the merchant to track the relationship. In at least one embodiment, any entry by the system onto the distributed ledger creates an immutable record accessible by the consumer and the merchant. In one or more embodiments, the consumer may remove the merchant's access to the consumer's information, and the system may remove the merchant's access to the consumer information on the consumer's application, and may delete any copies of the consumer's information from the merchant's application. In one embodiment, the removal of access is also logged onto the distributed ledger, so that both parties may confirm that the merchant no longer has access to and no longer possesses any copies of the consumer's information.

In various embodiments, the disclosed system allows a client to control a third party's usage of the client's personal information and other client-specific data. In general, in multiple embodiments, the system provides to the client the ability to input client data to the system and exchange or share the client data with third parties. In some embodiments, the client data may be personal identification information, personal consumer information, including consumer preferences and habits, or other similar information. In one or more embodiments, the third parties may be entities, such as merchants, that may utilize the client data to gather information regarding buying habits, preferences, and characteristics of clients for product development, marketing and advertising, and customer loyalty purposes.

In several embodiments, a client may download a client application onto a client computing device, such as a smart phone or personal computer. In one or more embodiments, the client may register with the system, and thereafter input client data into the client application. In many embodiments, the system generates and stores a client key upon a new client registering with the client application. In multiple embodiments, each registered client may have a personal, client key. In a further embodiment, the client key may be permanently linked to the registered client, even if the client uses the client application on another device, so that the client may access, edit, manage, and/or delete client data from the client application that was previously generated or stored on a different client device. In one embodiment, the system stores the client data on the client device and on the distributed ledger.

In various embodiments, once the client registers onto the system, a third party (a "requestor") may transmit a request to the client for the client to provide the requestor with access to the client data. In at least one embodiment, a requestor may be an entity or person that desires to utilize client data for the requestor's business purposes. In one embodiment, upon registration with the application, the system generates and assigns the requestor a requestor key. In one or more embodiments, the system transmits the requestor key along with each requestor request. In some embodiments, the client may accept or reject the requestor's request. In many embodiments, if the client accepts the requestor's request, the system grants the requestor access to the client data.

In several embodiments, the client application and the requestor application may communicate via a broker application, which may include a broker application server. In some embodiments, the broker application server may store client-requestor relationship information, such as location references for client data on the client application, client-requestor access lists, client key and requestor key information, requestor permissions lists, and other similar data. In one embodiment, the broker application server may communicate with the distributed ledger through a distributed ledger proxy. As a person having ordinary experience in the art will understand, a distributed ledger is a database that exists across multiple locations, where none of the locations are a centralized or main database. In at least one embodiment, each transaction, communication, or interaction between a requestor and client may be recorded onto the distributed ledger via the broker application server.

In multiple embodiments, the client may include a sensitivity level attached to the client data. In one or more embodiments, the sensitivity level generally refers to how the requestor may use the client data. In many embodiments, at the highest sensitivity level, the system may only allow the requestor to view the client data, and the system may log each time the requestor accessed the client data onto the distributed ledger. In some embodiments, lower sensitivity levels may allow the requestor to share the client data with other entities, make copies of the client data to be stored on the requestor application, and utilize the client data in other similar ways. In one embodiment, if the requestor shares the client data with other entities (i.e., provide other entities with access to the client data), the system may track the client data and which entities have access to the client data.

In many embodiments, in the event that the client wants to delete the client data from the system, the system may delete the client data from the original requestor and any subsequent entities that received access to the client data. In one or more embodiments, the system may delete the client data from the system such that no requestor may access the client data. In some embodiments, the system may remove access to the client data from a requestor rather than deleting the client data from the system. In multiple embodiments, to remove requestor access to a particular client data, the system may remove the requestor from the access list pertaining to the particular client data.

According to one aspect, the method for managing data, including the steps of: receiving client data associated with a user via a client application operating on a client device, wherein the user is associated with a client key that uniquely identifies the user; generating a client data package including the client data and the client key, and storing the client data package in a database associated with the client device; generating a client data package key to uniquely identify the client data package stored in the database; receiving, at the client application, a request from a requestor application operating on a requestor device for access to the client data, the request including a requestor key corresponding to a requestor associated with the requestor application, the request further including the client data package key corresponding to the client data package; determining if the requestor is authorized to access the client data by validating the requestor key in light of the client data package key and client key; and upon determination that the requestor is authorized to access the client data, retrieving the client data package from the database based on the client data package key, and providing access to the client data package to the requestor application.

According to another aspect, the method of this aspect or any other aspect, further including the steps of, prior to receiving, at the client application, the request from the requestor application for access to the client data: receiving, at a broker application operating on a server, a pre-request from the requestor application for access to the client data package; validating, at the broker application, that the requestor associated with the requestor application is authorized to make requests for data to the user; and upon determination that the requestor is authorized to make requests for data to the user: generating a broker key corresponding to the request; attaching the broker key to the request; and forwarding the broker key with the request from the broker application to the client application operating on the client device.

According to yet another aspect, the method of this aspect or any other aspect, further including the step of, prior to determining that the requestor is authorized to access the client data, validating, at the client application, that an attribute of the broker key matches an expected attribute of the broker key.

According to yet another aspect, the method of this aspect or any other aspect, further including the steps of: generating a response key for tracking that access to the client data package was provided to the requestor application, the response key including a concatenation of the requestor key, the client data package key, and the broker key; and posting the response key on a distributed ledger associated with the user.

According to yet another aspect, the method of this aspect or any other aspect, further including the step of generating a distributed ledger for tracking activities relating to the user. According to yet another embodiment, the method of this aspect or any other aspect, further including the steps of: creating a unique transaction identifier for each of the following activities and posting each unique transaction identifier on the distributed ledger: generating the client data package; storing the client data package in the database; generating the client data package key; receiving the request from the requestor application; and providing access to the client data package.

According to yet another aspect, the method of this aspect or any other aspect, wherein the client data package key includes sensitivity level information that defines access rights to the client data for a given requestor, and wherein the sensitivity level information is stored in the client key.

According to yet another aspect, the method of this aspect or any other aspect, further including the step of, prior to providing access to the client data package to the requestor application: retrieving the sensitivity level information from the client key; comparing the sensitivity level information to the requestor key to determine if the requestor has access rights for the client data; and upon determination that the requestor has access rights for the client data, providing access to the client data package to the requestor application.

According to yet another aspect, the method of this aspect or any other aspect, further including the steps of: receiving a request from the user at the client application to remove access by the requestor to the client data; and updating the client data package key to a value that prevents access to the client data package by the requestor application.

According to yet another aspect, the method of this aspect or any other aspect, further including the steps of: identifying on a distributed ledger associated with the user all keys relating to the client data package; and issuing new keys associated with the client data package to prevent further access to the client data.

According to one aspect, a system for managing data, including: a client device associated with a user, wherein the client device is operating a client application and wherein the user is associated with a client key that uniquely identifies the user; a requestor device associated with a requestor, wherein the requestor device is operating a requestor application and wherein the requestor is associated with a requestor key that uniquely identifies the requestor; and a database in electronic communication with the client device; wherein the client application operating on the client device is configured to: receive client data associated with the user; generate a client data package including the client data and the client key, and store the client data package in the database; generate a client data package key to uniquely identify the client data package stored in the database; receive, at the client application, a request from the requestor application operating on the requestor device for access to the client data, the request including the requestor key corresponding to the requestor associated with the requestor application, the request further including the client data package key corresponding to the client data package; determine if the requestor is authorized to access the client data by validating the requestor key in light of the client data package key and client key; and upon determination that the requestor is authorized to access the client data, retrieve the client data package from the database based on the client data package key, and provide access to the client data package to the requestor application.

According to another aspect, the system of this aspect or any other aspect, further including a server, wherein the server is operating a broker application, and wherein the server is in electronic communication with the client application of the client device and the requestor application of the requestor device; wherein prior to receiving, at the client application, the request from the requestor application for access to the client data, the broker application is configured to: receive, at the broker application operating on the server, a pre-request from the requestor application for access to the client data package; validate, at the broker application, that the requestor associated with the requestor application is authorized to make requests for data to the user; and upon determination that the requestor is authorized to make requests for data to the user: generate a broker key corresponding to the request; attach the broker key to the request; and forward the broker key with the request from the broker application to the client application operating on the client device.

According to a yet another aspect, the system of this aspect or any other aspect, wherein the client application is further configured to, prior to determining that the requestor is authorized to access the client data, validate, at the client application, that an attribute of the broker key matches an expected attribute of the broker key.

According to a yet another aspect, the system of this aspect or any other aspect, wherein the client application is further configured to: generate a response key for tracking that access to the client data package was provided to the requestor application, the response key including a concatenation of the requestor key, the client data package key, and the broker key; and post the response key on a distributed ledger associated with the user.

According to a yet another aspect, the system of this aspect or any other aspect, further including a distributed ledger used for tracking activities relating to the user.

According to a yet another aspect, the system of this aspect or any other aspect, wherein the client application is further configured to: create a unique transaction identifier for each of the following activities and post each unique transaction identifier on the distributed ledger: generate the client data package; store the client data package in the database; generate the client data package key; receive the request from the requestor application; and provide access to the client data package.

According to a yet another aspect, the system of this aspect or any other aspect, wherein the client data package key includes sensitivity level information that defines access rights to the client data for a given requestor, and wherein the sensitivity level information is stored in the client key.

According to a yet another aspect, the system of this aspect or any other aspect, wherein the client application is further configured to, prior to providing access to the client data package to the requestor application: retrieve the sensitivity level information from the client key; compare the sensitivity level information to the requestor key to determine if the requestor has access rights for the client data; and upon determination that the requestor has access rights for the client data, provide access to the client data package to the requestor application.

According to a yet another aspect, the system of this aspect or any other aspect, wherein the client application is further configured to: receive a request from the user at the client application to remove access by the requestor to the client data; and update the client data package key to a value that prevents access to the client data package by the requestor application.

According to a yet another aspect, the system of this aspect or any other aspect, wherein the client application is further configured to: identify on a distributed ledger associated with the user all keys relating to the client data package; and issue new keys associated with the client data package to prevent further access to the client data.

According to one aspect, a method for managing data, including the steps of: receiving a client data segment associated with a user of a client device via a client application operating on the client device, wherein a client key is associated with the user; storing the client data segment in a database on the client device; creating a record of the client data segment on the client device, the record including a storage location of the client data segment on the client device and a device identifier corresponding to the client device; transmitting the record of the client data segment to a server; assigning a client data segment key to the client data segment at the server; transmitting the client data segment key from the server back to the client device; creating, via the client application, a ledger entry corresponding to the client data segment on a distributed ledger associated with the user, the ledger entry including the client data segment key and the record of the client data segment, wherein the client key governs access to the distributed ledger.

According to another aspect, the method of this aspect or any other aspect, further including the steps of, prior to receiving the client data segment associated with the user of the client device via the client application operating on the client device: receiving registration information corresponding to the user of the client device via the client application; and generating the client key associated with the user.

According to yet another aspect, the method of this aspect or any other aspect, further including the steps of: receiving a request on a second client device associated with the user for access to the client data segment, wherein the request is received via the client application operating on the second client device, the request including the client key associated with the user; validating the client key to authorize the user to access the client data segment; upon validation of the client key, providing the client data segment key to the user on the second device; accessing the ledger entry corresponding to the client data segment on the distributed ledger based on the client data segment key; extracting, from the ledger entry, the device identifier corresponding to the client device and the storage location of the client data segment in the database on the client device; and retrieving the client data segment from the database on the client device to the client application operating on the second client device.

According to yet another aspect, the method of this aspect or any other aspect, further including the steps of, prior to receiving the request on the second client device associated with the user for access to the client data segment: receiving registration information corresponding to the user of the second client device via the client application; and assigning the client key associated with the user to the user of the second client device.

According to yet another aspect, the method of this aspect or any other aspect, wherein the client key further includes the device identifier corresponding to the client device and a second device identifier corresponding to the second client device.

According to yet another aspect, the method of this aspect or any other aspect, wherein the client key is associated with and stored on the client device and the second client device.

According to yet another aspect, the method of this aspect or any other aspect, wherein a portion of the client key is associated with and stored on the client device and the second client device, and another portion of the client key is associated with the ledger entry on the distributed ledger.

According to yet another aspect, the method of this aspect or any other aspect, further including the step of, prior to storing the client data segment in the database on the client device, generating and assigning a temporary key to the client data segment until the client data segment key is received from the server.

According to yet another aspect, the method of this aspect or any other aspect, wherein the temporary key is used to process and track the client data segment until the record of the client data segment is associated with the client data segment key and stored on the distributed ledger.

According to one aspect, a system for managing data, including: a client device associated with a user, wherein the client device is operating a client application, and wherein the client device includes a database; and a server in electronic communication with the client device; wherein the client device is configured to: receive a client data segment associated with the user of the client device, wherein a client key is associated with the user; store the client data segment in the database on the client device; create a record of the client data segment on the client device, the record including a storage location of the client data segment on the client device and a device identifier corresponding to the client device; and transmit the record of the client data segment to the server; wherein the server is configured to: assign a client data segment key to the client data segment at the server; and transmit the client data segment key from the server back to the client device; wherein the client device is further configured to: create, via the client application, a ledger entry corresponding to the client data segment on a distributed ledger associated with the user, the ledger entry including the client data segment key and the record of the client data segment, wherein the client key governs access to the distributed ledger.

According to another aspect, the system of this aspect or any other aspect, wherein the client device is further configured to, prior to receiving the client data segment associated with the user of the client device via the client application operating on the client device: receive registration information corresponding to the user of the client device via the client application; and generate the client key associated with the user.

According to yet another aspect, the system of this aspect or any other aspect, further including: a second client device associated with the user, wherein the second client device is operating the client application, wherein the second client device is configured to: receive a request on the second client device associated with the user for access to the client data segment, wherein the request is received via the client application operating on the second client device, the request including the client key associated with the user; validate the client key to authorize the user to access the client data segment; upon validation of the client key, provide the client data segment key to the user on the second device; access the ledger entry corresponding to the client data segment on the distributed ledger based on the client data segment key; extract, from the ledger entry, the device identifier corresponding to the client device and the storage location of the client data segment in the database on the client device; and retrieve the client data segment from the database on the client device to the client application operating on the second client device.

According to yet another aspect, the system of this aspect or any other aspect, wherein the second client device is further configured to, prior to receiving the request on the second client device associated with the user for access to the client data segment: receive registration information corresponding to the user of the second client device via the client application; and assign the client key associated with the user to the user of the second client device.

According to yet another aspect, the system of this aspect or any other aspect, wherein the client key further includes the device identifier corresponding to the client device and a second device identifier corresponding to the second client device.

According to yet another aspect, the system of this aspect or any other aspect, wherein the client key is associated with and stored on the client device and the second client device.

According to yet another aspect, the system of this aspect or any other aspect, wherein a portion of the client key is associated with and stored on the client device and the second client device, and another portion of the client key is associated with the ledger entry on the distributed ledger.

According to yet another aspect, the system of this aspect or any other aspect, wherein the client device is further configured to, prior to storing the client data segment in the database on the client device, generate and assign a temporary key to the client data segment until the client data segment key is received from the server.

According to yet another aspect, the system of this aspect or any other aspect, wherein the temporary key is used to process and track the client data segment until the record of the client data segment is associated with the client data segment key and stored on the distributed ledger.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
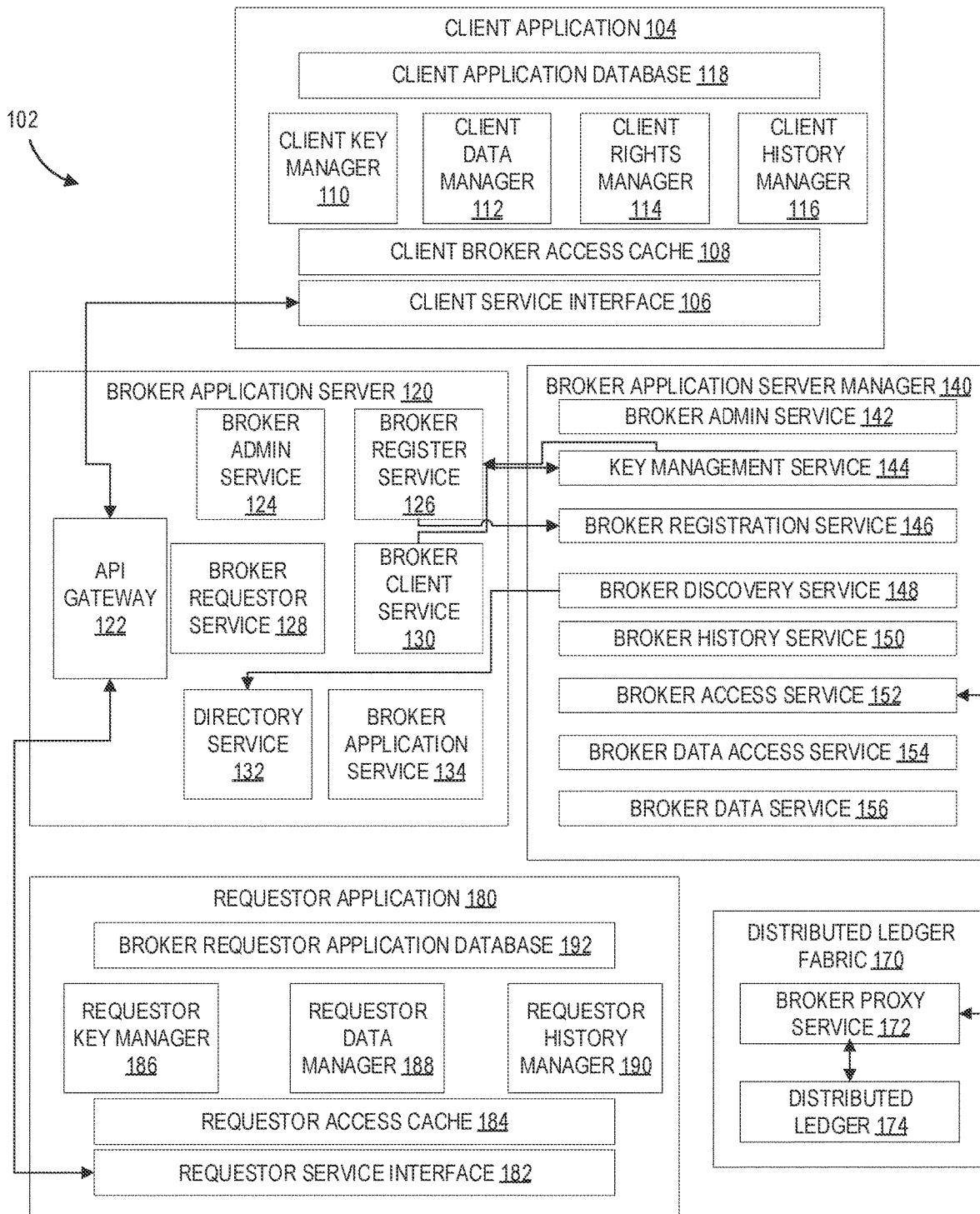
FIG. 1 illustrates an exemplary client controlled data management system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Definitions

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

"Client" generally means the owner of personal data, and may be referred to as "consumer", "customer", "citizen", or any other identifier that refers to an individual or entity who has identifying information of interest to another party.

"Requestor" generally means an entity that has interest in obtaining and using personal data from the client, and may be referred to as "business", "company", "government", or any other identifier that refers to an entity who intends to collect and use a client's personal data.

"Broker" generally means a third party that facilitates a secure exchange of consent and data sharing between the client and the requestor. The "broker" may alternatively be referred to as "trusted exchange", or any other identifier that refers to a trusted third party that facilitates the data sharing relationship between the client and the requestor.

Overview Aspects of the present disclosure generally relate to systems and methods for the use of software, hardware, and related systems to receive or generate personal consumer information, exchange and manage information with merchants, and remove produced information from merchant systems.

In various embodiments, the disclosed system allows a client to control a third party's usage of the client's personal information and other client-specific data. For example, in one embodiment, a client may be a consumer of a retail merchant, and the merchant, though the disclosed system, may request the consumer's information, including product preferences and consumer personal information. Continuing with the example, in one embodiment, in exchange for the consumer's information, the merchant may offer the consumer early access to particular products, discount codes, and/or other marketing experiences. In many embodiments, the consumer may accept the merchant's request, allowing the merchant access to the consumer's information on the client's application. In some embodiments, the relationship between the consumer and the merchant is logged onto a distributed ledger, thereby allowing both the consumer and the merchant to track the relationship. In one or more embodiments, the consumer may remove the merchant's access to the consumer's information, and the system may remove the merchant's access to the consumer information on the consumer's application, and may delete any copies of the consumer's information from the merchant's application. In one embodiment, the removal of access is also logged onto the distributed ledger, so that both parties may confirm that the merchant no longer has access to and no longer possesses any copies of the consumer's information.

In at least one embodiment, the consumer may limit how the merchant may interact with the consumer information, such as only allowing the merchant to view the information and not store a copy of the information, or the consumer may grant the merchant unlimited access, which may include allowing the merchant to store a copy of the information and send the consumer's information to other entities. In several embodiments, the system may track each interaction between the merchant and the consumer information, and log each interaction onto the distributed ledger. For example, in one embodiment, if the merchant sends the consumer information to another entity, the system may log the interaction onto the distributed ledger, and notify the consumer that the merchant sent the consumer's information to another entity. Continuing with the example, in some embodiments, the entity receiving the consumer's information from the merchant may thereafter have a direct relationship with the consumer that the consumer may manage.

In general, in multiple embodiments, the system provides to the consumer (also referred to as a "client") the ability to input client data to the system and exchange or share the client data with third parties. In one embodiment, these third parties may offer discounts or other marketing experiences in exchange for the client data, and may utilize the client data to make more targeted advertisements to the client. In some embodiments, the client data may be personal identification information, personal consumer information, including consumer preferences and habits, or other similar information. In one or more embodiments, the third parties may be entities, such as merchants, that may utilize the client data to gather information regarding buying habits, preferences, and characteristics of clients for product development, marketing and advertising, and customer loyalty purposes.

In several embodiments, a client may download a client application onto a client computing device, such as a smart phone or personal computer. In one or more embodiments, the client may register with the system, and thereafter input client data into the client application. In many embodiments, the system generates and stores a client key upon a new client registering with the client application. In multiple embodiments, each registered client has a personal, permanent client key. In one embodiment, the system stores the client data on the client application (e.g., on the client device) or in a cloud associated with the client. In some embodiments, client data that is associated with a low sensitivity level (e.g., '0') may be stored on the requestor device.

In various embodiments, once the client registers onto the system, a third party (a "requestor") may transmit a request to the client for the client to provide the requestor with access to the client data. In at least one embodiment, a requestor may be an entity or person that desires to utilize client data for the requestor's business purposes. In one embodiment, upon registration with the application, the system generates and assigns the requestor a requestor key. In one or more embodiments, the system transmits the requestor key along with each requestor request. In some embodiments, the client may accept or reject the requestor's request. In many embodiments, if the client accepts the requestor's request, the system grants the requestor access to the client data.

In several embodiments, the client application and the requestor application may communicate via a broker application, which may include a broker application server. In some embodiments, the broker application server may store client-requestor relationship information, such as location references for client data on the client application, client-requestor access lists, client key and requestor key information, requestor permissions lists, and other similar data. In one embodiment, the broker application server may communicate with the distributed ledger through a distributed ledger proxy. In at least one embodiment, each transaction, communication, or interaction between a requestor and client may be recorded onto the distributed ledger via the broker application server.

In multiple embodiments, the client may include a sensitivity level attached to the client data. In one or more embodiments, the sensitivity level generally refers to how the requestor may use the client data. In many embodiments, at the highest sensitivity level, the system may only allow the requestor to view the client data, and the system may log each time the requestor accessed the client data onto the distributed ledger. In some embodiments, lower sensitivity levels may allow the requestor to share the client data with other entities, make copies of the client data to be stored on the requestor application, and utilize the client data in other similar ways. In one embodiment, if the requestor shares the client data with other entities (i.e., provide other entities with access to the client data), the system may track the client data and which entities have access to the client data.

In many embodiments, in the event that the client wants to delete the client data from the system, the system may delete the client data from the original requestor and any subsequent entities that received access to the client data. In one or more embodiments, the system may delete the client data from the system such that no requestor may access the client data. In some embodiments, the system may remove access to the client data from a requestor rather than deleting the client data from the system. In multiple embodiments, to remove requestor access to a particular client data, the system may remove the requestor from the access list pertaining to the particular client data.

Exemplary Embodiments

Referring now to the figures, for the purposes of example and explanation of the fundamental processes and components of the disclosed systems and methods, reference is made to FIG. 1, which illustrates an exemplary, high-level overview of one embodiment of an exemplary client controlled data management system 102. As will be understood and appreciated, the exemplary, high-level overview 100 shown in FIG. 1 represents merely one approach or embodiment of the present system, and other aspects are used according to various embodiments of the present system.

As shown in FIG. 1, a client controlled data management system 102 is described, according to one embodiment of the present disclosure. In several embodiments, the system 102 may include a client application 104, a broker application server 120, a broker application server manager 140, a distributed ledger fabric 170, and a requestor application 180.

In various embodiments, the client application 104 is a downloadable software application, or may be non-downloadable software accessed through the Internet or other such network. In one or more embodiments, the client application 104 may operate on existing operating platforms and on computing devices, such as but not limited to, mobile devices, personal computers, tablets, smart watches, and other similar devices. In some embodiments, the client application may include a user interface. In at least one embodiment, the client application 104 may include elements such as a client service interface 106, a client-broker access cache 108, a client key manager 110, a client data manager 112, a client rights manager 114, a client history manager 116, and a client application database 118. In many embodiments, these elements within the client application

104 may be software modules or programs running on a client device, or algorithms operating software, or APIs, microservices, etc., as will occur to someone of skill in the art.

In multiple embodiments, the client service interface 106 may provide a requesting mechanism for the broker services and management of client session tokens. In some embodiments, the client service interface 106 may utilize secure communication protocols, such as, but not limited to, hypertext transfer protocol secure (https) with transport layer security (tls) version 1.2 or version 1.3, or equivalent secure communication protocols, or more secure protocols. In one embodiment, the client service interface 106 is the secure communication mechanism by which the system requests and responds to client data.

In several embodiments, the system 102 may utilize the client-broker access cache 108 to cache authentication requests and responses, and provide management of data for key validation processes. In at least one embodiment, the client-broker access cache 108 may securely manage key operations, including a create key operation, an authenticate key operation, a delete key operation, and a replace key operation. In one or more embodiments, the client-broker access cache 108 may authenticate the broker key that is a part of the requestor request process.

In various embodiments, the client key manager 110 may perform key management operations, including the create key operation, the authenticate key operation, the delete key operation, and the replace key operation. In one or more embodiments, the client key manager 110 may determine the validity of a supplied key for an exchange of client data between the broker application and the client application 104. In one embodiment, the client key manager 110 may receive an authenticated broker key from the client-broker access cache 108 and validate whether the requestor may access client data. In some embodiments, the client key manager 110 may communicate with the client broker access cache 108 and the client service interface 106 to process requests for client data. In at least one embodiment, the client key manager 110 may manage the secure exchange of key data with the broker application server 120 for the purposes of authentication operations with the requestor application 180. In one embodiment, the client key manager 110 may be a signed service that is callable through the client service interface 106.

In multiple embodiments, the client data manager 112 is a service interface layer between a client-broker data store and calling services for the client data. In one embodiment, the client data manager 112 may manage requests for persistent client data. In at least one embodiment, the client data manager 112 may respond to requests for data operations for client data. In some embodiments, the client data manager 112 may validate that any stored client data is encrypted, and may determine whether key constraints have been validated prior to the system retrieving core client data. In one embodiment, the client data manager 112 may provide operations to the calling services of the client key manager 110 and the client rights manager 114. In many embodiments, the client data manager 112 may create data response packages for authorized requests for client data sharing by the client.

In several embodiments, the client rights manager 114 may allow the client to register specific client data for sharing or storage, without requests for access from requestors. In one embodiment, the client may input personally identifiable information (PII), including, but not limited to, name, address, phone number, email, opinions, preferences, or other similar data. In some embodiments, the client may input product preference information, which may include general consumer habits and preferences, such as, but not limited to, pricing preferences, in person or online shopping preferences, email subscription preferences, job information, and/or other similar information. For example, in one embodiment, the client may register with the client application, and instead of responding to specific requests from requestors, the client may input specific data that the client is comfortable sharing, and thereafter, share the specific data with requestors.

In some embodiments, a requestor may be a merchant or other entity that wants to utilize client data for business purposes, such as, but not limited to, marketing purposes. In at least one embodiment, a requestor may also be a client, thereby being able to requestor requests to clients and receiving requestor requests from other requestors. For example, in one embodiment, an entity may register as a requestor with the requestor application and may receive requests from other requestors to share access to the client data that the entity has access to. In another example, in some embodiments, an individual may own a business and register the business as a requestor with the requestor application, but also input the individual's information as client information and share the individual's client data with other requestors.

In one or more embodiments, the client rights manager 114 may provide the client with a mechanism to register and manage client data packages, register client requests, and manage the rights of the client to access the identified client data. In some embodiments, the client rights manager 114 may include a mechanism that allows the client to manage the creation, sharing, and revocation of access rights to the registered client data. In many embodiments, the client rights manager 114 may also allow the client to review client data access history, which is a log of client data that the client has allowed requestors to access. In at least one embodiment, the client rights manager 114 may allow the client to perform associations between data elements and requestors. In one embodiment, the client rights manager 114 may communicate with the broker application server 120 to record any access rights activity related to the sharing of client data and associated permissions. In one or more embodiments, the client rights manager 114 may allow sharing of the same client data between multiple requestors, upon receiving authorization from the client. In at least one embodiment, the client rights manager 114 may store metadata, such as, but not limited to, sensitivity level metadata that is exchanged with a requestor. In several embodiments, sensitivity level may refer to the level of access to client data the client grants to a requestor. For example, in one embodiment, the client application 104 may allow access to a requestor to read, but not copy, client data, and the client rights manager 114 stores the metadata regarding the access rights of the client data exchange. In some embodiments, the activity of the client rights manager 114 is logged into a log managed by the client history manager 116.

In various embodiments, the client history manager 116 stores any requests and actions that have taken place against the registered client data. In some embodiments, the client history manager 116 may provide, via a key, such as the client authentication key, a view of local application history and access to a distributed ledger 174 for client data exchanges between the client and requestors. In at least one embodiment, the client history manager 116 may allow the client to view activity for the local client application 104 and connected activity. In one or more embodiments, the local application activity may include activity on the client application 104, and the connected activity may include negotiated exchanges between the client and a requestor, including grants of access to client data, revocation of access to client data, and successful and unsuccessful retrievals of client data. In many embodiments, in the connected level, the client application 104 may view any violations of access rights by a requestor for the client data, which may include sharing attempts for non-sharable client data and attempts by a requestor to use client data after access the client data has been revoked. In one embodiment, the client history manager 116 may provide a read-only view of local activity and connected activity. In at least one embodiment, the client history manager 116 may provide a view to the client of successful and unsuccessful connected activity. In one or more embodiments, the client history manager 116 may notify the client of significant trust events that have occurred with the authorized shared client data. In one embodiment, significant trust events may include, but are not limited to, a requestor sharing client data, a requestor violating access rights, permissions, or the intent level of the shared client data, and a requestor attempting to access revoked client data.

In multiple embodiments, the client application database 118 may be a data store that contains encrypted data for identified shared client data, which may include all shared client data for broker application requests. In some embodiments, the client application database 118 may retrieve or provide metadata that is used to retrieve access rights, validation keys, and other identified operations with the client data. In one or more embodiments, the client application database 118 may include pointers to data objects as identified by the client, or may include the actual client data the client wants to register. In many embodiments, the client application database 118 may store the registers needed for data access, rights management, and key management. In one embodiment, the client application database 118 may store data in a form that is only accessible via a data services layer. In at least one embodiment, the client application database 118 may include a secure filestore for large objects.

In various embodiments, the broker application server 120 provides a microservices interface and communications between the client application 102, the requestor application, and the broker application server manager. In at least one embodiment, the broker application server 120 may include an API gateway 122, a broker administration service 124, a broker register service 126, a broker requestor service 128, a broker client service 130, a directory service 132, and a broker application database 134.

In multiple embodiments, the API gateway 122 may include a secure application programming interface (API) façade that may service secure communications (e.g., https) requests and responses. In one or more embodiments, the API gateway 122 may manage work load balancing, authentication proxy, and/or service routing for the system 102. In at least one embodiment, the API gateway 122 may support representational state transfer (restful) services, or a similar software architectural style.

In several embodiments, the broker admin service 124 may provide services that support both requestor and client support services. In some embodiments, the services that support both requestor and client support services may include, but are not limited to, password updates, diagnostic services, notification services, and view open requests services. In one embodiment, the broker admin service 124 may provide a service entry point.

In various embodiments, the broker register service 126 may allow the registration of requests from clients and requestors. In one or more embodiments, clients and requestors may be registered to the broker application server 120 via the broker register service 126.

In multiple embodiments, the broker requestor service 128 may provide access for requestor requests for sharing client data, access rights changes, client notifications, reviewing request and response statistics, reviewing requestor sensitivity levels, reviewing history (connected activity), and/or manage requestor certificates.

In several embodiments, the broker client service 130 provides access for the client to receive and review requests from requestors, provide data to a requestor, update access rights for requestors, review connected activity, and manage client certificates.

In various embodiments, the directory service 132 may provide a discoverable directory of available APIs for the broker application. In some embodiments, the directory service 132 provides metadata that describes the broker service, such as service names, service calling parameters, service versions, and/or certificate management for the broker services. In one embodiment, the directory service 132 may provide a service entry point and broadcast mechanism. In many embodiments, the service entry point and broadcast mechanism may enable the disclosed system to operate asynchronously.

In multiple embodiments, the broker application database 134 stores encrypted metadata for the generation and management for the client registration key, the requestor registration key, and the client data registration key. In one or more embodiments, the broker application database 134 may store data registration and validation information for client data and associated access rights with the shared data.

In various embodiments, the broker application server manager 140 may include a broker administration service 142, a key management service 144, a broker registration service 146, a broker discovery service 148, a broker history service 150, a broker access service 152, a broker data access service 154, and a broker data service 156.

In one or more embodiments, the broker administration service 142 may provide microservices that support the administration of the broker application server 120.

In multiple embodiments, the key management service 144 may provide mechanisms for managing the key management operations for the broker application server 120. In one embodiment, the key management operations may include APIs. In at least one embodiment, the key management operations may include, but are not limited to, operations for creating, updating, resetting, deleting, retrieving, generating, and managing client data and keys relating to the sharing of client data.

In several embodiments, the broker registration service 146 is utilized to register clients and requestors to the broker application server 120. In one or more embodiments, the broker registration service 146 may send the client data and transaction data to a distributed ledger for recording against a client or requestor block.

In various embodiments, the broker discovery service 148 may register service data on the broker application server 120. In one or more embodiments, as the services are updated and added to the broker discovery service 148, the service data becomes discoverable through the directory service 132. In at least one embodiment, the broker discovery service 148 provides services for the management, publication, and authentication of exposed services, as well as the services that manage and request certificates for the signing of the services. In one embodiment, the exposed services are the services performed by the broker application server manager 140, including but not limited to, requesting services, authentication services, response services, and secondary services.

In multiple embodiments, the broker history service 150 responds to history requests from clients and requestors by exposing history data for client and requestor data and exchanges, and providing an interface to reporting services. In one or more embodiments, the broker history service 150 may include allowing a client to view distributed ledger history and/or broker transaction history, which may include information regarding both successful and unsuccessful requests. In one embodiment, the broker history service 150 may verify the client trust level for an exchange of data. In at least one embodiment, the broker history service 150 may not access the stored client data or exchange value data because the broker application server 120 does not keep or store copies of exchanged value data.

In many embodiments, the broker access service 152 may provide an interface to external applications and external service providers that support the broker application server 120 and the client and requestor activity. In at least one embodiment, the broker access service 152 may provide a connector approach to facilities such as the distributed ledger.

In several embodiments, the broker data access service 154 may provide a level of indirection for calling services to access data on the broker application server 120. In some embodiments, the broker data access service 154 is capable of providing a plurality of data stores for storing broker application server data. In at least one embodiment, the broker data access service 154 may act as a broker layer between the components and the microservices that are supported within the components and data stored on the broker application server 120. In one embodiment, the broker data access service 154 validates secure access to broker data while providing transformation of requests and responses for broker data.

In one or more embodiments, the broker data service 156 provides persistence and management of broker application server data. In one embodiment, the broker data service 156 may logically encapsulate all data sources, and physically implement data in a data store that may be a database or a file system.

In multiple embodiments, the distributed ledger fabric 170 may include a broker proxy service 172 and a distributed ledger 174.

In various embodiments, the broker proxy service 172 may allow the system 100 to access distributed ledger data for clients and client transactions. In one or more embodiments, the broker application server 120 may access the distributed ledger 174 through the distributed ledger fabric 170 via the broker proxy service 172.

In several embodiments, the distributed ledger 174 may provide an immutable ledger of transactions and activity for clients, client data, and client transactions. In one embodiment, the distributed ledger 174 may record the transactions and exchange of client data between a client and a requestor. In some embodiments, the distributed ledger 174 may be implemented in a blockchain. As a person having ordinary experience in the art will understand, a blockchain is a type of distributed ledger where blocks are appended to the blockchain. In many embodiments, both the client and the requestor may view the distributed ledger 174, and because each interaction with client data is stored as an entry on the distributed ledger 174, the client may use the distributed ledger 174 to track the usage of client data. In one or more embodiments, if a client removes access to client data from a requestor, or deletes a client data package so that no requestor may access the client data within the client data package, the system 102 may enter the removal action onto the distributed ledger 174. For example, in one embodiment, a client may grant access to a requestor to four different client data packages, and the system 102 may create four separate entries on the distributed ledger 174, each entry indicating that the requestor has access to one of the four client data packages. Continuing with the example, in some embodiments, if the client removes access from the requestor for all client data packages, the system may create four separate entries on the distributed ledger 174, each entry indicating that the requestor no longer has access to one of the four client data packages.

In multiple embodiments, the requestor application 180 is an interface operated by an entity that desires access to client data. In at least one embodiment, the requestor application 180 may include a requestor service interface 182, a requestor access cache 184, a requestor key manager 186, a requestor data manager 188, a requestor history manager 190, and a broker requestor application database 192.

In various embodiments, the requestor service interface 182 may provide a requesting mechanism for the broker services and management of client session tokens. In some embodiments, the client service interface may utilize secure communication protocols, such as, but not limited to, hypertext transfer protocol secure (https) with transport layer security (tls) version 1.2 or version 1.3, or equivalent secure communication protocols, or more secure protocols. In one embodiment, the requestor service interface 182 is a secure communication mechanism by which the requestor requests client data from a client.

In several embodiments, the requestor access cache 184 may provide cache authentication requests and responses, and may provide data management for key validation. In one embodiment, the requestor access cache 184 may push client requests to a client, in which the client requests include requests for changes in access rights of client data and requests for new client data.

In at least one embodiment, the requestor key manager 186 may validate key information and access rights when client data is retrieved from a client. In many embodiments, the requestor key manager 186 may utilize a hashing code to ensure that the retrieved client data is only usable within the access rights provided by the client. In one embodiment, the requestor key manager 186 is utilized by the system 100 to manage the exchange of requests and responses within the broker application server 120 by assigning a broker key to each request sent by a requestor to a client. In some embodiments, the request for client data may be attached to the assigned broker key as an object.

In multiple embodiments, the requestor data manager 188 may manage the responses for data operations from exchanged client data. In at least one embodiment, the requestor data manager 188 may manage the encrypted client data received from the client and may ensure that keys are validated prior to retrieving client data. In some embodiments, the requestor data manager 188 may provide a service interface layer between the broker data store and the calling services for the client data. In one or more embodiments, the requestor data manager 188 may provide operations to the calling services of the requestor key manager 186.

In various embodiments, the requestor history manager 190 may include a mechanism for the requestor to view and verify requests and actions that have taken place for registered client data. In at least one embodiment, the requestor history manager 190 may provide the requestor with visibility of prior requests and statistics relating to the prior requests, such as response times for the prior requests. In one or more embodiments, the requestor history manager 190 may provide a read only view of local activity and client grants of access to client data.

In several embodiments, the broker requestor application database 192 may include a data store that contains encrypted data for identified shared client data and data for broker application requests. In at least one embodiment, the broker requestor application database 192 may store the metadata associated with retrieving access rights, validation keys, and other identified operations for the shared client data. In one embodiment, the broker requestor application database 192 may have a secure filestore for storing large objects associated with the shared client data or client data requests.

As will be understood and appreciated by those of ordinary skill in the art, the above descriptions and illustrations of the system 102 depicted in FIG. 1 is but one proposed implementation of an embodiment of the present disclosure. The specific modules shown and described for carrying out the functionalities shown in FIG. 1 may be carried out by different modules organized in a different fashion. Accordingly, the specific architecture of modules shown in FIG. 1 is intended to be illustrative only and no limitation with respect to the current disclosure or claim scope is intended thereby.

Figure 2:
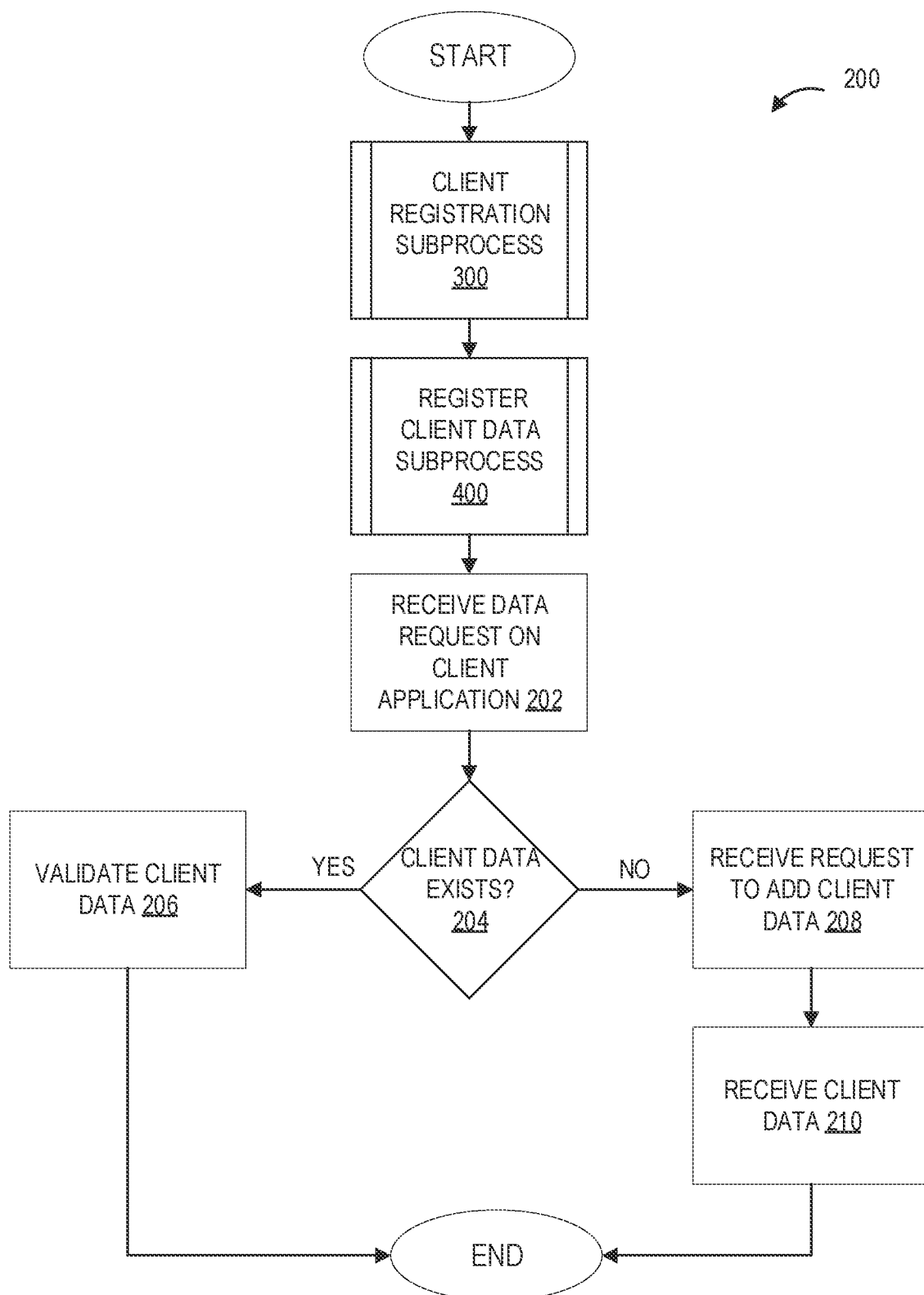
FIG. 2 illustrates an exemplary client request activity process, according to one embodiment.

Turning to FIG. 2, an exemplary client request activity process 200 is described, according to one embodiment of the present disclosure. In one or more embodiments, a requestor may, via the application, offer discounts or other marketing experiences in exchange for a client completing the client request activity process 200 and allowing the requestor to access the client's data. For example, in one embodiment, a requestor may be a merchant that is offering 15% off certain products or services if a shopper (client) downloads the client application 104 (if the shopper does not already have it downloaded) and inputs client data and shares the data with the merchant. Continuing with this example, in some embodiments, by offering discounts or other marketing experiences and having the shopper (client) reach out to the merchant on the client application, the shopper establishes the client-requestor relationship. Still continuing with the example, in at least one embodiment, with the establishing of the client-requestor relationship, the client application may include a default setting that gives the merchant (requestor) permission to send the shopper (client) additional requests for other or updated client data.

In at least one embodiment, as a precursor to the client request activity process 200, a client may have downloaded the client application 104 to the client's computing device, which may include a mobile device, personal computer, smart watch, tablet, or other similar computing device. In another embodiment, the client may access the client application 104 via cloud computing methods and/or software as a service methods. In some embodiments, a requestor may also have downloaded the requestor application 180 on a computing device, such as a mobile device, personal computer, smart watch, tablet, or other similar computing device.

In various embodiments, to begin the client request activity process 200, the system 102 may receive the client input information for the client registration subprocess 300. In some embodiments, the system 102 may also request the client input information, and the system 102 receive the input information, in a register client data subprocess 400. In many embodiments, if the client has previously completed the client registration subprocess 300, the system 102 may bypass the client registration subprocess 300. In one embodiment, once the system 102 receives the client data input by the client, the system 102, via the client application 104, may secure and classify the client data.

In one or more embodiments, once the client has completed the client registration subprocess 300 and the register client data subprocess 400, at step 202, the client may receive a request at the client application 104 from a requestor for the exchange of client data from the client to the requestor. In at least one embodiment, the client may or may not have input the specific client data that the requestor requests from the client.

In several embodiments, at step 204, the system 102 determines if the requested client data exists. In at least one embodiment, if the client data exists, at step 206, the system 102 may validate the existing client data. In one embodiment, the client data exists if the client has input the specifically requested client data into the client application 104 prior to receiving the request for the specifically requested client data.

In many embodiments, if the client data does not exist, then at step 208, the system 102 sends a request to the client to input the specific requested client data, and the client receives the request to input the specific requested client data on the client application 104. In one or more embodiments, at step 210, if the client desires to comply with the request to input the specifically requested client data, then the client may input, and the system 102 may receive, the specifically requested client data.

In multiple embodiments, the system 102 may manage the exchanges between the client and the requestor via the broker application. In some embodiments, the broker application server 120 may generate and provide keys for encrypting and decrypting the exchanged data. In one embodiment, during the validation of the keys, the system 102 may determine whether a sensitivity level of the client's data is maintained by the requestor. In one or more embodiments, in addition to the keys to exchange the data, the access rights to use the data are validated when the requestor retrieves the data for processing. In one embodiment, all activities associated with the trust relationship between the client and requestor are managed by the broker application as requests to both client and requestor applications.

Figure 3:
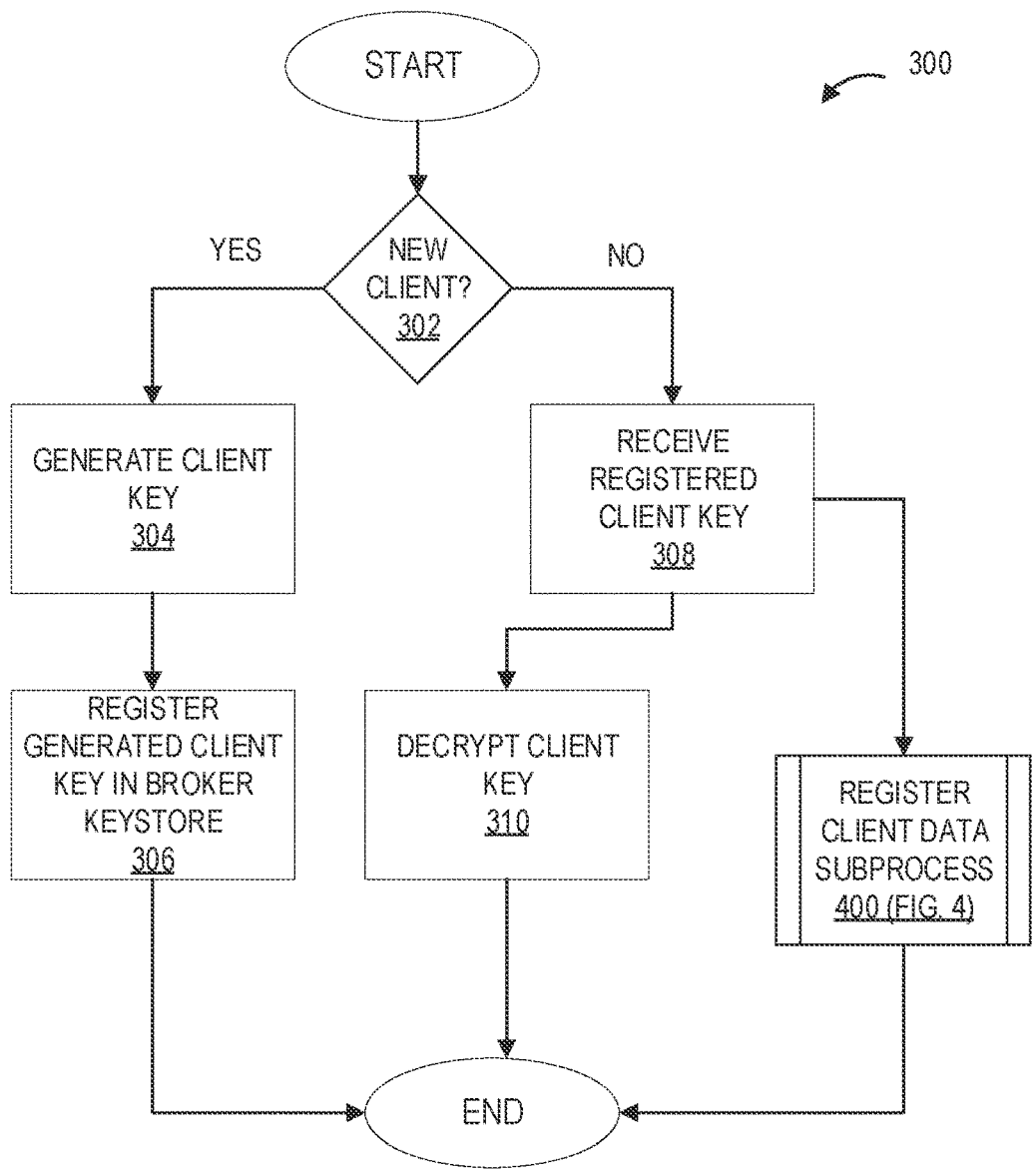
FIG. 3 illustrates an exemplary client registration process, according to one embodiment of the present disclosure.

Turning to FIG. 3, a flowchart of an exemplary client registration subprocess 300 is described, according to one embodiment of the present disclosure.

In multiple embodiments, a client may initiate the client registration subprocess 300 by downloading the client application 104 and registering with the client application 104. In several embodiments, the client application 104 may be a downloadable software application. In one embodiment, the system 102 may request and, thereafter, receive identifying information from the client via the client application 104. In some embodiments, identifying information may include, but is not limited to, a client's name, address, email address, phone number, gender, age, payment information (e.g., credit card information), and other similar information. In one or more embodiments, the client registration may also include the creation of the client register within a distributed ledger. In at least one embodiment, the client register may record all interactions that take place with the client, the client's data, and the client and requestor data exchanges. In some embodiments, access to the registration function of the broker application server manager 140 is via the broker register service 126.

In various embodiments, when a new client is brought onto the broker application server 120, by downloading the client application 104 or creating a new account on the client application 104, the client may register the client application 104. In some embodiments, client registration establishes the client application 104, and client registration enables registering and obtaining the client key. In one or more embodiments, the client key is used with all interactions with the broker application server 120 and for managing the control and flow of client data and transaction data from the client application 104.

In some embodiments, at step 302, the system 102 may identify if the client is a new client or not. In one embodiment, system 102 may determine if the client is not a new client by the presence of a valid client key. In at least one embodiment, if the system 102 does not determine that a valid client key exists for the client, then the system 102 may determine that the client is a new client.

In various embodiments, if the client is a new client, at step 304, the broker application server 120 or the client application 104 generates a client key for the new client. In one or more embodiments, the client key serves as a unique registration for the client and subsequent data activity. In at least one embodiment, the key management service 144 generates the client key. In one embodiment, the system 102 encrypts the client key when the system 102 sends the client key to the client application 104. In many embodiments, once the client key is generated, at step 306, the system 102 registers the client key at the broker keystore, which is located on the broker application server 120. In one or more embodiments, the registration of the client key at the broker keystore may include storing the client key in a table so that the system 102 may reference the broker keystore in validation processes. In one embodiment, the broker keystore may store key information for any key generated by the system.

In various embodiments, if the client is already registered with the broker application server 120 (i.e., the system 102 determines that a valid client key exists for the client), then at step 308, the system retrieves the client key from the client application 104 on the client's local computing device. In one embodiment, a client's client key is portable across all registered client devices and may be used to tag client data from unregistered devices. In one or more embodiments, the client key is generated from the broker keystore, therefore in the event of loss or corruption of the client device, the client key can be reissued or revalidated. In at least one embodiment, the output of step 308 goes to both step 310 and subprocess 400 in parallel processes.

In multiple embodiments, a client may request a revalidation of the client key. In one embodiment, the client key may remain encrypted when stored on the client device. In at least one embodiment, the client key may not be decrypted unless a request to decrypt the client key is issued by the broker client service 130. In one embodiment, at step 310, the system 102 decrypts the client key data.

In various embodiments, the broker client database, located on the broker application server 120, may hold key data as well as name value pairs for all client data that is registered. In one embodiment, during client registration subprocess 300, each client data package is registered with a unique identifier that indicates the origin of the data and the metadata information around creation in the broker client database. In one or more embodiments, in addition to this data, the broker client database may contain client announcement information that is used between client and requestor. In at least one embodiment, client announcement information may enable the requestor to make requests directly to the client.

In multiple embodiments, client data registered by the broker application server 120 remains with the client application and is only shared when the client explicitly responds to a request. In one embodiment, the client data may have an associated access right or sensitivity level. In one or more embodiments, this may determine the sensitivity of the data and whether the recipient is entitled to share the data.

In various embodiments, once the system 102 receives the registered client key for the client, the system may allow the client to input new client data via the register client data subprocess 400.

Figure 4:
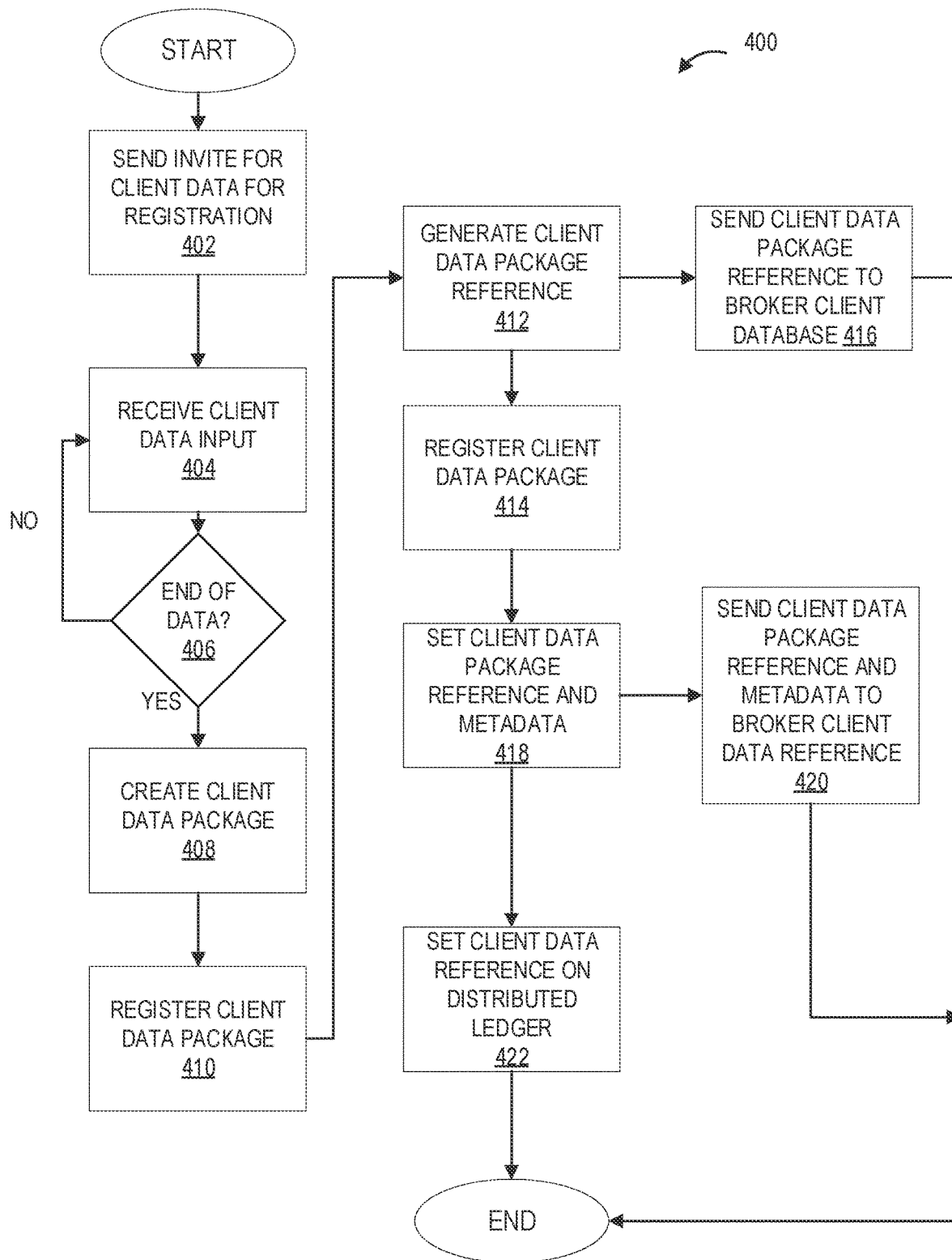
FIG. 4 illustrates an exemplary register client data process, according to one embodiment of the present disclosure.

Turning to FIG. 4, a flowchart of an exemplary register client data subprocess 400 is described, according to one embodiment of the present disclosure. In multiple embodiments, once the client is registered with the client application 104 and the system 102 has generated the client key, the client may thereafter input client data into the client application. In many embodiments, to register client data onto the client application 104, a client may input client information via a GUI on the client device and client application 104, and submitting the inputted information to the client application 104 for registering on the client application. In some embodiments, the system 102 may create a client data package from the inputted information once the register client data subprocess 400 is complete.

In various embodiments, the register client data subprocess 400 occurs when the client registers any element of data. In some embodiments, a client may input client data to be registered by the system 102 without a requestor request. For example, in one embodiment, a client may decide that the client data is valuable enough to want to store the client data in the broker client database. In one or more embodiments, once the client data is stored inside the broker client database, the system assigns the client data a client data segment key. In at least one embodiment, the system 102 utilizes the client data segment key to retrieve the associated client data from the broker client database once an authenticated request for the associated client data is received by the system 102.

In some embodiments, the system 102 may encrypt the client data and client data segment key before storing the client data and client data segment key within the broker client database. In one embodiment, all requests for either the client data or the client data segment key validation are managed via web service call to a broker authentication service, using secure protocols such as https. In at least one embodiment, the broker authentication service may authenticate requests, clients, requestors, broker keys, and other items.

In various embodiments, at step 402, the system may invite the client to input client data for registration. In some embodiments, at step 404, in response to a request, the client may input personally identifiable information (PII), including, but not limited to, name, address, phone number, email, opinions, preferences, or other similar data into the client application 104. In at least one embodiment, the client may register client data that the client wants to keep confidential, including PII data. In one or more embodiments, the registered client data is stored with a client registration key and with an internal client reference.

In several embodiments, at step 406, the system 102 determines whether the client has completed inputting client data. In one embodiment, if the system 102 determines that there is additional client data that has been input, the system 102 returns to step 404.

In multiple embodiments, the internal client reference is registered on the broker application server 120 together with the client registration key, date of registration and associated default access permission. In one embodiment, the register client data subprocess 400 is repeated for all of the client data that the client inputs to register.

In various embodiments, client data is registered on the client application 104, and once the client is ready to complete the registration process, the keys and metadata are passed to the broker application server for registration.

In at least one embodiment, the client data reference may include the following data, processes, and/or APIs such as the client registration key, client data key reference, data value location reference, and creation timestamp.

In multiple embodiments, at step 408, once the client data to be registered is identified by the system 102, a client data package is created. In one embodiment, the client data package is a logical grouping of registered client data. In one or more embodiments, the client data package may be exchanged with the requestor. In at least one embodiment, the client data package may include the following data, processes, and/or APIs such as: client data, client key, package reference identifier, client data key reference [1-m], creation timestamp, and package description.

In some embodiments, at step 410, the system 102 may register the client data package on the client database on the client application 104. In one or more embodiments, the client data register is the client's official record of registered client data on the client application. In at least one embodiment, the client data is encrypted on the client application 104. In some embodiments, the client data register may contain a pointer to the value data that may ultimately be passed to the requestor.

In various embodiments, at step 412, the system 102 generates (step 412) and registers (step 414) a client data package reference on the client application 104 in the client data registry. In one embodiment, the client data and reference keys are persisted. In one or more embodiments, value data may be stored in the client database, within a secure file system on the client application 104 on the client device, or within a cloud available secure file system accessible by client. In some embodiments, the output of step 412 proceeds in parallel to both step 414 and 416.

In at least one embodiment, at step 416, the system 102 may send and store the client data package reference in the broker client database. In many embodiments, the client data package reference may include the client registration key, the client package key, the client data reference key, and the creation timestamp. In some embodiments, the client key is the generated client key that is unique to the client's client application 104, is generated at client registration, and may be in a "bigint" data type format. In many embodiments, a "bigint" data type format is a data type format that provides a way to represent whole numbers larger than 2 to the $53^{rd}$ power, minus 1 ($2^{53}-1$). In one or more embodiments, the client data package key is associated with the client data package, and is used to anchor the client data when the client data is being shared with a requestor. In one embodiment, the client package key is in an alphanumeric format. In some embodiments, the client data reference key is a unique key for a line item of the client data that is being stored. In one or more embodiments, the client data reference key is in an integer format. In at least one embodiment, a creation timestamp is a timestamp representation of the date and time the client data package was created. In one embodiment, the system 102 generates the creation timestamp. In some embodiments, the creation timestamp is stored as Greenwich Mean Time and converted to a local time zone via the system 102.

In multiple embodiments, at step 414, the system registers the client data package on the broker application server 120. In one or more embodiments, the broker application server 120 utilizes a number of services to register the client data package. In one embodiment, the key services are managed by the key management service 144 and the broker client service 130 on the broker application server 120. In some embodiments, the key management service 144 is utilized to generate the transaction key based on the client key and the client registration key. In at least one embodiment, the transaction key, the client key, and/or the client registration key are used to manage the exchange of data between the client and the requestor.

In some embodiments, the broker client service 130 registers the client data package and notifies the client once the client data package has been successfully registered with the broker application server 120.

In multiple embodiments, the key management services 144 may contain, but is not limited to, the following micro services, getclientregistrationkey, generateclienttransactionkey, validateclientpackagekey, encryptclientpackagekey, decryptclientpackagekey, putclientpackagekey.

In various embodiments, the broker client service 130 may contain, but is not limited to, the following microservices, getclientregistrationstatus, getclientpackagesecurityvalue, convertclienttimestamp, putclientdatapackagerequest, postclientdataresponse.

In several embodiments, at step 418, the system 102 sets the client data package reference and associated metadata. In one or more embodiments, the client application 104 may generate information regarding the content of the client data package, such as a reference to the client data package location and metadata that describes the contents of the client data package. In some embodiments, the output of step 418 proceeds in parallel to both step 420 and step 422.

In one embodiment, at step 420, the system 102 sends the client data package reference and associated metadata to the broker client data reference. In at least one embodiment, the client application 104 may transmit the client data package reference and content metadata to the broker application server 120.

In some embodiments, at step 422, the broker application server 120 may pass information, such as the client identifier, client key, client data package reference, content metadata, and/or client data reference key, to the distributed ledger 174.

In various embodiments, default attributes of the distributed ledger 174 are used to ensure the integrity of the data being stored. In at least one embodiment, a client may have the ability to retrieve a distributed ledger record of a transaction by using the client registration key to directly call the client distributed ledger, where the system 102 retrieves a list of transactions from the distributed ledger 174. In one or more embodiments, the list of transactions is an immutable record of all client activity.

Figure 5A:
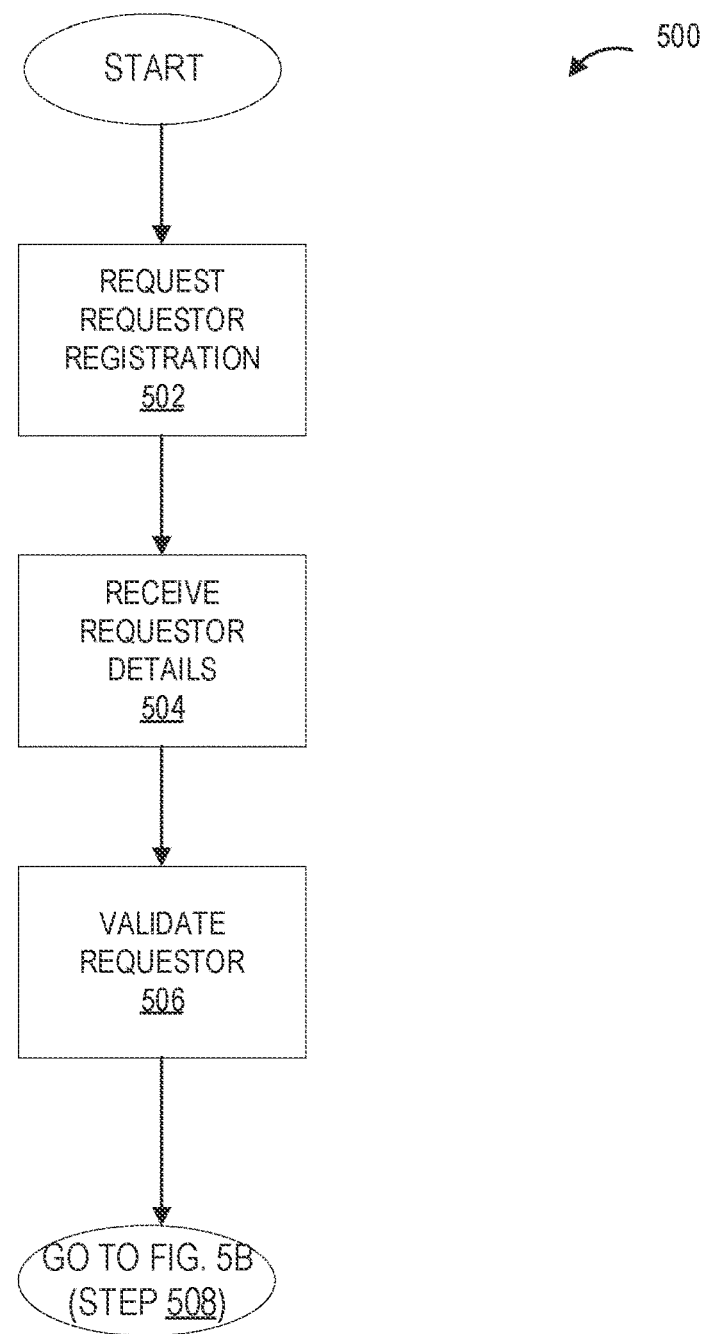
FIG. 5A illustrates an exemplary requestor registration process, according to one embodiment of the present disclosure.
Figure 5B:
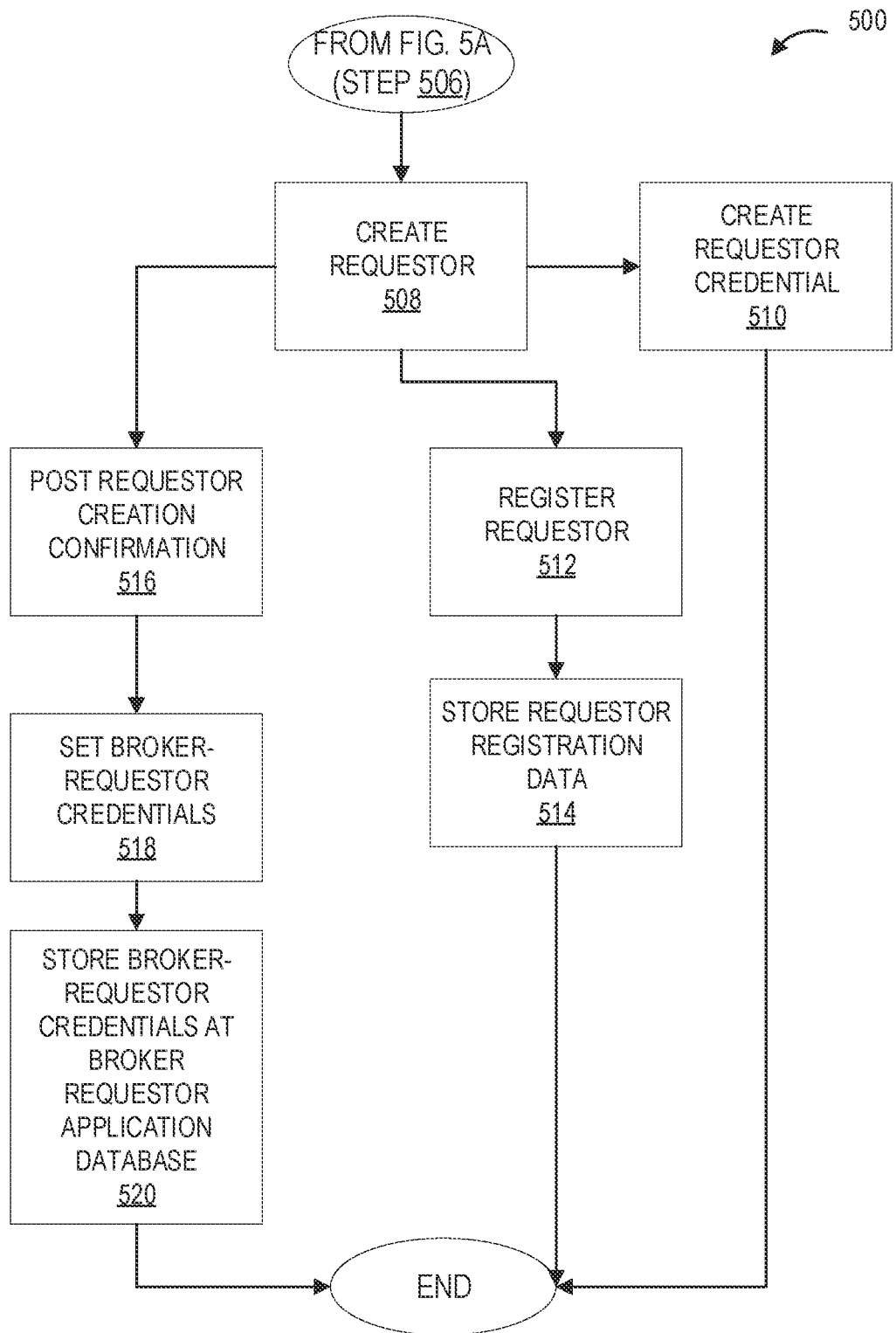
FIG. 5B illustrates an exemplary requestor registration process, according to one embodiment of the present disclosure.

Turning to FIGS. 5A-B, a flowchart of an exemplary requestor registration process 500 is shown, according to one embodiment of the present disclosure.

In multiple embodiments, at step 502, the requestor registration process 500 is initiated when a requestor is introduced to the broker application server 120. In at least one embodiment, the requestor may self-register through the registration component of the requestor application 180 or be invited to register by a client interaction.

In several embodiments, the requestor registration process 500 may service all types of requestors. In one embodiment, a requestor may register line-of-business specific data as extensions to the data defined for the clients against a core data model for the request or data store. In some embodiments, the core data model may indicate certain standard information that may be included in client data. In many embodiments, the requestor may include business-specific requests in a request to a client, such that the client may input information beyond the information in the core data model when answering the requestor's business-specific request.

In some embodiments, a requestor may also be a client, however the nature of the trust relationship between the client and the requestor may preclude sharing of this data. In one embodiment, the requestor application 180 may allow for the copying of client data and requestor data for the purpose of population.

In various embodiments, a client's role may change from situation to situation, and the corresponding trust associated with that client may depend on the role that the client plays with other clients. For example, in one embodiment, a client may be an entity that receives requests from requestors, but the entity may also be a requestor that requests client data from other clients. Continuing with the example, in at least one embodiment, the entity, when acting as a client, may set sensitivity levels for the entity's client data for how the requestors that have access to the entity's client data may use the client data. Continuing with the example, in some embodiments, when the entity is acting as a requestor, the entity may have a different trust level associated with it, depending on how the entity treats other clients' data.

In some embodiments, at step 504, the system 102 may receive, from the requestor application 180, the following requestor details, including, but not limited to, requestor name, requestor address, requestor contact details, authorized clients, branding information such as logos, images, headers, and footers, a requestor registration code, if provided by broker, and/or requestor contact lists.

In some embodiments, the system 102, via a requestor registration API, may provide an ingest service for the above details, with the requestor being able to maintain this data via an API. In one embodiment, the requestor registration API may include the following operations: getrequestordetails, getrequestorartifacts, getrequestorauthcode, updaterequestordetails, updaterequestorartifacts, updaterequestorcontactlist, and updaterequestorrewards.

In multiple embodiments, at step 506, the system validates the requestor details prior to submission into the broker application server 120. In at least one embodiment, the system 102 may receive verification of the details entered by the requestor prior to creation on the broker application server 120. In one embodiment, the requestor may verify that the requestor details are correct.

In various embodiments, the requestor application 180 may ask the requestor for payment or promotional details once the requestor validates the details. In multiple embodiments, the requestor application 180 may capture different details depending on whether the requestor enters either payment or promotional details, but also may capture the same details. In one embodiment, promotion registrations may be subject to limitations that are implemented at runtime, not during registration.

In some embodiments, the system 102 persists the requestor registration data to the broker application server 120. In one embodiment, these services may call the following microservices as part of the step 504: confirmregistrationdetails, getsubscriptiondetails, and getpromotiondetails.

As shown in FIG. 5B, the process 500 continues at step 508. In multiple embodiments, the requestor details are persisted to the broker application server 120. In one embodiment, at step 508, during the creation of the requestor, the system 102 creates a requestor key to be associated with all requests emanating from the requestor because verifiable trust is the basis of the relationship between the requestor and the client in order to track how the requestor uses accessed client data. In one or more embodiments, the requestor key is stored on the broker application server 120 together with the requestor details and is sent to the requestor application 180. In at least one embodiment, the requestor key may be used for, but not limited to, the following activities: creating new client data requests, validating retrieval of client data within the requestor application 180, validation against the requestor access cache 184 for data access, and updating client data rights. In some embodiments, the output of step 508 proceeds in parallel to steps 510, 512, and 516.

In various embodiments, at step 510, the creation of the requestor credential takes place on the broker application server 120 and results in the generation of a requestor key by the broker application server 120 for the requestor. In one embodiment, the requestor key is used to identify the requestor whenever a request is made to validate the data being sent by a client. In one or more embodiments, the requestor key may come from the broker application server 120 and is stored on the requestor application 180.

In some embodiments, a requestor may register for one or more keys depending on if the requestor operates two or more business entities, though a requestor may have one key per business entity. For example, in one embodiment, if one requestor operates in two separate lines of business in two separate business entities, the requestor may have two requestor keys, one requestor key for each business entity.

In various embodiments, at step 512, the requestor may be registered on the broker application server 120, which includes the requestor details. In one embodiment, once registered on the broker application server 120, the requestor key is made ready to exchange with the requestor. In one or more embodiments, the completion of the requestor registration may take place within a single action. In at least one embodiment, a data package, including the requestor key and requestor details, of exchange between the broker application server 120 and the requestor is made ready for transfer. In some embodiments, the exchange may utilize a secure transport and is performed in an asynchronous manner to ensure that the package is delivered to the requestor. In one embodiment, the exchange may be supported in a synchronous transaction. In several embodiments, at step 514, the requestor registration data may be stored in the broker requestor application database 192.

In some embodiments, the requestor may delegate authority to use the requestor application 180 to other staff members of the requestor when registering. For example, in one embodiment, an organization may have multiple staff members in the marketing department and want all of the staff members to have access to the requestor application.

In various embodiments, at step 516, the system 102 may validate or confirm the requestor after requestor creation. In many embodiments, upon creation of the requestor, the broker application server may respond to the requestor that the creation was successful, which may indicate that requestor credentials are pending.

In multiple embodiments, at step 518, setting the requestor credentials may take place on the broker application server 120, where an exchange between the broker application server 120 and the requestor application 180 may take place. In at least one embodiment, the requestor data package that is exchanged may contain, but is not limited to, the requestor key, any time dependent details such as effective or expiry dates, and the requestor certificate that was generated for the exchange.

In at least one embodiment, at step 520, the broker-requestor credentials and the requestor data package may be stored on the broker-requestor application database 192.

In one embodiment, the system 102 registers the requestor to the broker application server 120 and may have the corresponding requestor key for requesting client data via the broker exchange mechanism.

Figure 6A:
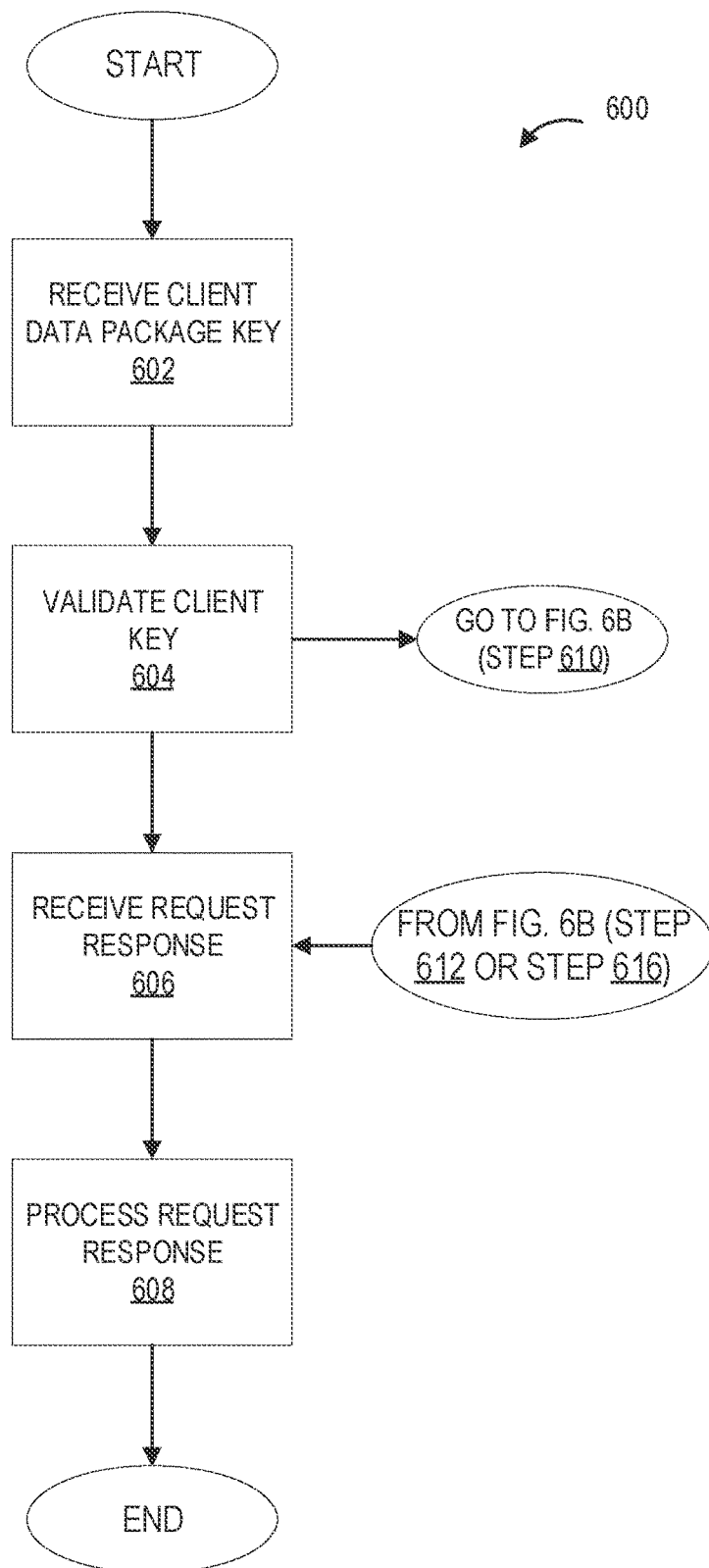
FIG. 6A illustrates an exemplary process for validating client data, according to one embodiment of the present disclosure.
Figure 6B:
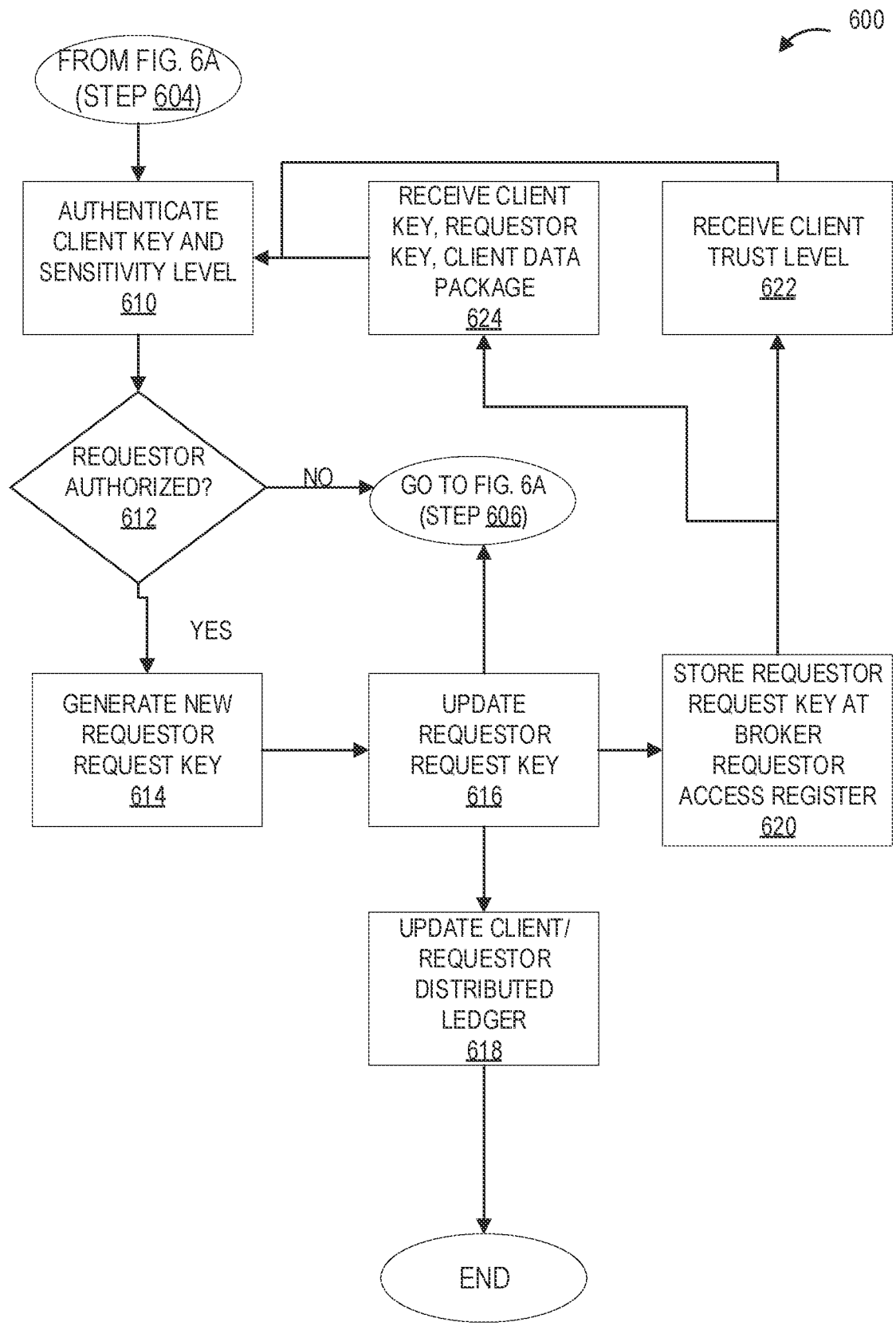
FIG. 6B illustrates an exemplary process for validating client data, according to one embodiment of the present disclosure.

Turning now to FIGS. 6A-B, a flowchart of an exemplary validate client data process 600 is shown, according to one embodiment. In various embodiments, the system 102 initiates process 600 when a requestor accesses client data shared by the client. In one embodiment, when the client shares client data with the requestor, access rights associated with the client data are also shared with the requestor. In one or more embodiments, these access rights may determine how the client data may be utilized by the requestor, whether validation must be performed for every request by the requestor, and/or the method of validation performed by the requestor.

In one embodiment, the exchange of data is facilitated by the broker application server 120, but the client data that is shared may originate from the client's private data store. In one or more embodiments, the role of the broker application server 120 is to facilitate the requestor's request and ensure the integrity of the request and data exchange. In at least one embodiment, all encryption and decryption activities may only take place through the broker application server 120 and the respective client applications 104 and the requestor application 180.

In various embodiments, all activities that take place between the broker application server 120 and the client are recorded in the distributed ledger 174. In some embodiments, each interaction between a requestor and a client is stored on the distributed ledger 174. In one or more embodiments, any client or requestor may be able to see that there is a particular distributed ledger entry, but only the particular requestor and the particular client involved in the creation of the particular distributed ledger entry, as well as the broker application server 140, may cause the distributed ledger entry to be decrypted so that the distributed ledger entry is viewable by the requestor or client. For example, in one embodiment, a requestor A and a client B may have entered into an exchange of client data, causing the system 102 to create a distributed ledger entry C on the distributed ledger 174. Continuing with the example, in several embodiments, all other clients and requestors may see that distributed ledger entry C exists, but only requestor A and client B may view the information inside the distributed ledger entry C. In many embodiments, the interaction may include a requestor request to a client for access to client data, a requestor accessing client data, a requestor sharing client data with other requestors, a client removing access to client data from a requestor, a client editing client data, and other similar interactions. In at least one embodiment, client registration and requestor registration is also logged on the distributed ledger. In one or more embodiments, the distributed ledger may be utilized to track which requestors have access to client data, and how the requestors are using the client data. In one embodiment, recording the activities in the distributed ledger 174 may provide a register to the client of all data sharing that has taken place as well as a trail of requestor activity for client data that is tagged as sensitive. In some embodiments, the higher the sensitivity level of a piece of client data, the more details about the transaction and usage of the client data is stored, so that the client may keep the requestor more accountable for more sensitive client data.

In multiple embodiments, there may be up to three different categories of activity that may take place against the shared data between the client and the requestor. In at least one embodiment, these activities may include management activities, including grants and revokes of data between the client and the requestor, rights activities, including the allocation and changes of access rights for the client data that has been shared, and authentication activities, which are performed against all client data that has been shared by a client.

In various embodiments, at step 602, the system 102 may receive the client data package key, which is generated when the client creates a client data package. In one embodiment, the client data package key is obtained from the broker application server 120.

In some embodiments, the broker application server 120 is the location of record for the registration of the client data package. In at least one embodiment, a client may have one or more client data packages registered. In one or more embodiments, the one or more client data packages may be registered on the client application 104 via the broker application server. In one embodiment, the data packages may be stored in a public cloud available to the client.

In several embodiments, obtaining the client data package key may provide context for the validation request. In one embodiment, at step 604, the requestor application 180 initiates the validation request via a microservice or other operation capable of initiating the validation request. In one embodiment, the microservice may be a validateclientdatarequest micro service. In one or more embodiments, the validation request may contain, but is not limited to, the following information: requestor request number, client data package identifier, requestor request intent, date and time of the request, source of the requestor request, and client registration number.

In multiple embodiments, at step 604, the broker application server 120 may validate the client key to ensure that the requestor requested a valid client key. In one embodiment, if the client key is valid, the system 102 may evaluate the requestor's relationship to the client. In one or more embodiments, if the system 102 allows the requestor to access client data, the process 600 may continue. In at least one embodiment, if the system 102 does not allow the requestor to access client data, the broker application server 120 may refuse the request on behalf of the client.

In some embodiments, if the client has removed access to the client data for the requestor, the system 102 may deny the requestor's request. In one embodiment, each client data access attempt by a requestor is logged to the client distributed ledger 174. In one or more embodiments, the requestor request number, client data package identifier, requestor request intent, date and time of the request, source of the requestor request, and client registration number are passed to the client distributed ledger 174 and the system 102 notifies the client of the denied access attempt. In many embodiments, the output of step 604 may proceed in parallel to both step 606 and step 610 (in FIG. 6B).

In several embodiments, at step 606, the requestor may request and receive data validation for the client data package via a request/response mechanism. In many embodiments, at step 606, the system may receive inputs from steps 604 and either step 612 (if the requestor is not authorized) or step 616 (if the requestor is authorized). In at least one embodiment, the request/response mechanism may be active for the requestor to process and access a client data package. In one or more embodiments, based on access rights granted by the client, the access rights may enable a behavior of the request/response mechanism to delegate a response to the requestor request. In one embodiment, the behavior may only apply when access to the interface is interrupted, as may be the case in any asynchronous transaction. In many embodiments, the process 600 is supported by an asynchronous store and post mechanism from the broker application server 120. In some embodiments, the asynchronous store and post mechanism may enable a request and/or response to retransmit in case the request or response is interrupted.

In one or more embodiments, at step 608, the system 102 may process the response to the requestor request. In at least one embodiment, the system 102 may grant the requestor access to the client data in processing the response to the requestor request.

FIG. 6B is a continuation of process 600. In multiple embodiments, at step 610, once the client access for the requestor has been validated (step 604), the system 102 determines a sensitivity level for the client data. In one embodiment, the sensitivity level (also referred to herein as "access rights" or "permissions") is the level of access rights assigned by the client to the client data package for the requestor. In one or more embodiments, a higher sensitivity level generally corresponds to a lower amount of access rights the requestor has to the client data. In at least one embodiment, the broker application server 120 may provide oversight or scrutiny to the actions the requestor takes with the client data.

For example, in one embodiment, the system 102 may include five sensitivity levels (0, 1, 2, 3, 4). In at least one embodiment, each sensitivity level may corresponds to a client intent and a broker action. Continuing with the example, in many embodiments, the client may assign a client data package a sensitivity level of "0". In some embodiments, the sensitivity level "0" may correspond to a client intent that indicates to the requestor that the client data shared by the client has minimal value and the requestor may share the client data with other entities without reference to the broker application server 120 for validation and that the client does not request logging of actions on the client data beyond the initial sharing of the client data. In one or more embodiments, for client data with a sensitivity level of "0", the broker application server may only act as a pass through for future data access requests for the client data. In some embodiments, however, the client may revoke access to the client data package or increase the sensitivity level of the client data package, which may cause the broker application server 120 to push the revocation to the requestor and remove the client data package from the requestor application 180.

In multiple embodiments, a sensitivity level of "1" may cause the requestor application 180 to log all accesses to the client data package, may allow the client to view all access to the client data package within the distributed ledger 174, but may still allow the requestor to share the client data with other entities. In one embodiment, for client data with a sensitivity level of "1", the broker application server 120 may validate the requestor's access to the client data package, and each validation of the requestor request may be logged within the client distributed ledger 174.

In various embodiments, a sensitivity level of "2" may cause the requestor to confirm any sharing requests, meaning that if the requestor wants to share the client data with other entities, the requestor, via the requestor application 180, sends a request to the client application 104, requesting the client's permission to share the client data. In at least one embodiment, the requestor may store a copy of the client data for sharing with other entities after the client grants access to the client data. In some embodiments, for client data with a sensitivity level of "2", the broker application server 120, through the requestor application 180, may track the client data shared by the requestor to other entities via the requestor request key, as the requestor request key is attached to the client data package upon the requestor request. In one embodiment, the broker application server 120 may verify and validate the sensitivity level with the requestor and track copies of the client data package through the requestor application.

In several embodiments, the sensitivity level "3" may cause the requestor to identify the other entities that the requestor shares the client data package with, and the client, after the requestor identifies the other entities, may authorize the requestor to share the client data package with the identified entities. In some embodiments, the client may not authorize the requestor to share the client data package with the identified entities, which may cause the system 102 to transmit a notification to the requestor, and the client may share the client data package with the identified entity directly, such that the identified entity becomes a new requestor to the client. In many embodiments, for client data with a sensitivity level of "3", the broker application server 120 may provide an exchange between the client and the requestor at the initiation of the requestor request to share the client data with another entity. In one embodiment, for client data with a sensitivity level of "3", all exchanges of client data pass onto the client distributed ledger 174. In one or more embodiments, the information from the exchanges of client data passed onto the client distributed ledger 174 may include, but is not limited to, requestor request key, client data package, requestor delegate or third party, delegate access intent, and client response to requestor request to share the client data with another entity.

In various embodiments, the sensitivity level "4" may allow the requestor to access the client data package with the requestor application 180, but not share the client data package with other entities. In one or more embodiments, all activity regarding the client data package is logged onto the client distributed ledger 174 via the broker application server 120, and the client data package may be protected by utilizing a rotating requestor request key. In at least one embodiment, the client may grant the requestor access to the client data package for only a finite period of time. In some embodiments, for client data with a sensitivity level of "4", the broker application server utilize rotating requestor request keys for every requestor request, such that the requestor request keys change each time the requestor accesses the client data package. In many embodiments, if the broker application server 120 receives a request from the client via the client application 104, to delete requestor access to the client data package, the broker application server 120 may initiate the delete request on the requestor access cache 184 and may delete the client data package off the requestor file store. In one embodiment, the requestor application 180 may populate incorrect values for the client data package key to ensure the client data is no longer usable.

In multiple embodiments, the system 102 may determine whether the requestor is authorized to perform the action being requested on the requested client data by comparing the requested action against the assigned sensitivity level for the client data. In one or more embodiments, at step 612, the system 102 performs an authorization in memory using the existing requestor request key. In one embodiment, a valid requestor request key is generated with each requestor request. In at least one embodiment, both the requestor's access to the client data and the requestor request key are verified.

In one or more embodiments, the requestor request key may be created with each authorized access to shared client data and regenerated when accessed with client data requests. In at least one embodiment, the population of the requestor request key is bidirectional from the broker application server 120. In some embodiments, the regenerated requestor request key is stored within the requestor request. In one embodiment, the validation of the current requestor request key may take place prior to the retrieval of the shared client data.

In various embodiments, the requestor may fail to be authorized due to an event, such as, but not limited to, the client revoking access to the requestor for the requested client data, the previous generation of the requestor request key being out of date, or the access right to the client data does not match the requestor intent.

In some embodiments, the results of step 612 are logged to the broker application server and may populate the client distributed ledger. In one embodiment, if the requestor is not authorized at step 612, the system 102 may deny the requestor access to the client data, and record the denial against the client data package in the client's distributed ledger 174.

In one or more embodiments, at step 614, if the requestor is authorized and the access is valid at step 612, a new requestor request key is generated and passed to the requestor access cache 184 for processing and storage with the client data package on the requestor application.

In various embodiments, at step 614, once the current requestor request key has been validated for client data access, the data is read into the cache for processing by the requestor, and a new (rotating) requestor request key may be generated. In one embodiment, the new requestor request key is associated with the accessed client data package. In at least one embodiment, the new requestor request key is generated by the broker application server 120 in response to the requested access on the requestor application 180.

In multiple embodiments, at step 616, the broker application server 120 may update the requestor request key on the requestor application 180. In one embodiment, new requestor request key is a unique key identifying the requestor request, location, and time as the input to the generated requestor request key. In one or more embodiments, the generated requestor request key is distributed from the broker application server 120 to the requestor application 180 via the following services: getclientdatapackagekey and setclientdatapackagerightlevel. In some embodiments, the output of step 616 may proceed in parallel to steps 606, 618, and 620.

In various embodiments, at step 620, the updated requestor request key may be stored on the broker requestor access register on the broker application server 120. In at least one embodiment, the broker requestor access register may provide a server-side log of activity to requests for client data. In one or more embodiments, all shared client data is logged to the broker requestor access register.

In several embodiments, at step 622, the system 102 may receive the sensitivity level from the client application 104.

In some embodiments, at step 624, once all validations have been completed, the system 102 receives the client key, the requestor key and the client data package for inputs into the process at step 614. In one embodiment, the client data package includes the client data package key, the client data package metadata, and the client data package values. In at least one embodiment, the client data package metadata may include the sensitivity level information.

In various embodiments, at step 618, the result of the validation request for the client data package is recorded onto the client distributed ledger 174 via the distributed ledger fabric 170. In one embodiment, the record associated with the client data package may apply to the client and is generated by an interface to the broker application server 120.

In multiple embodiments, the distributed ledger 174 may record, but is not limited to, the following information from the validation request: client data package identifier, the requestor, the requestor's location (e.g., IP address), client action, request intent, and request result. In at least one embodiment, the request intent is the sensitivity level the requestor requests when requesting data from a client. For example, in some embodiments, the requestor, when sending a request to a client, may include a request that the client data include a specific sensitivity level, such as a low sensitivity level so that the requestor may store the client data upon receiving access to the client data. In one embodiment, a requestor may request a sensitivity level that supports the sharing of data with other entities, which represents a lower sensitivity level, but the client may only allow the requestor to have the client data, which represents a higher sensitivity level.

In various embodiments, the system 102 may process a response from the broker application server 120 by reading the current key passed by the broker application server 120. In some embodiments, the response is a subprocess in which the broker application server 120 reads and caches the current key. In one embodiment, if the current requestor request key passed by the broker application server 120 is a match to the current requestor request key, the access is processed, and the data validated and retrieved. In many embodiments, the current requestor request key passed by the broker application server 120 may not match the current requestor request key if the client has made changes to the client data or changed the sensitivity level. In one or more embodiments, this process may take place in memory and is a volatile activity. In at least one embodiment, the broker application server 120 may pass two keys that are processed, the current key for the client data package and the new key for the client data package.

In some embodiments, if key processing is successful, the client data package is read into memory for processing by the requestor, which renders the metadata and values accessible for the requestor.

In multiple embodiments, the new requestor request key is associated with the client data access and is stored with the requestor copy of the client data. In one embodiment, based on the action passed across with the response from the broker application server 120, the system 102 may access the client data and the references to the client data within the requestor application 180 are updated.

In several embodiments, there may be multiple intents with the client action, which may include, but is not limited to reading the client data package, updating the client data package (updating the client data values), and deleting the client data package In various embodiments, when the client intent is to remove the requestor's access to the client data, the requestor application 180 may remove the client data package from the requestor application 180. In one embodiment, because the requestor application 180 may maintain a register of storage locations for the data previously processed, the delete intent may remove the client data from all storage locations through a physical and/or digital deletion of the client data on the requestor application. In one or more embodiments, deleted client data may result in a low value key being passed to the requestor application 180, which may render the data inaccessible on the requestor application 180. In at least one embodiment, the low value key may be a null value, such that the system 102, when reading the low value key, determines that the low value key is not a valid key.

Figure 7A:
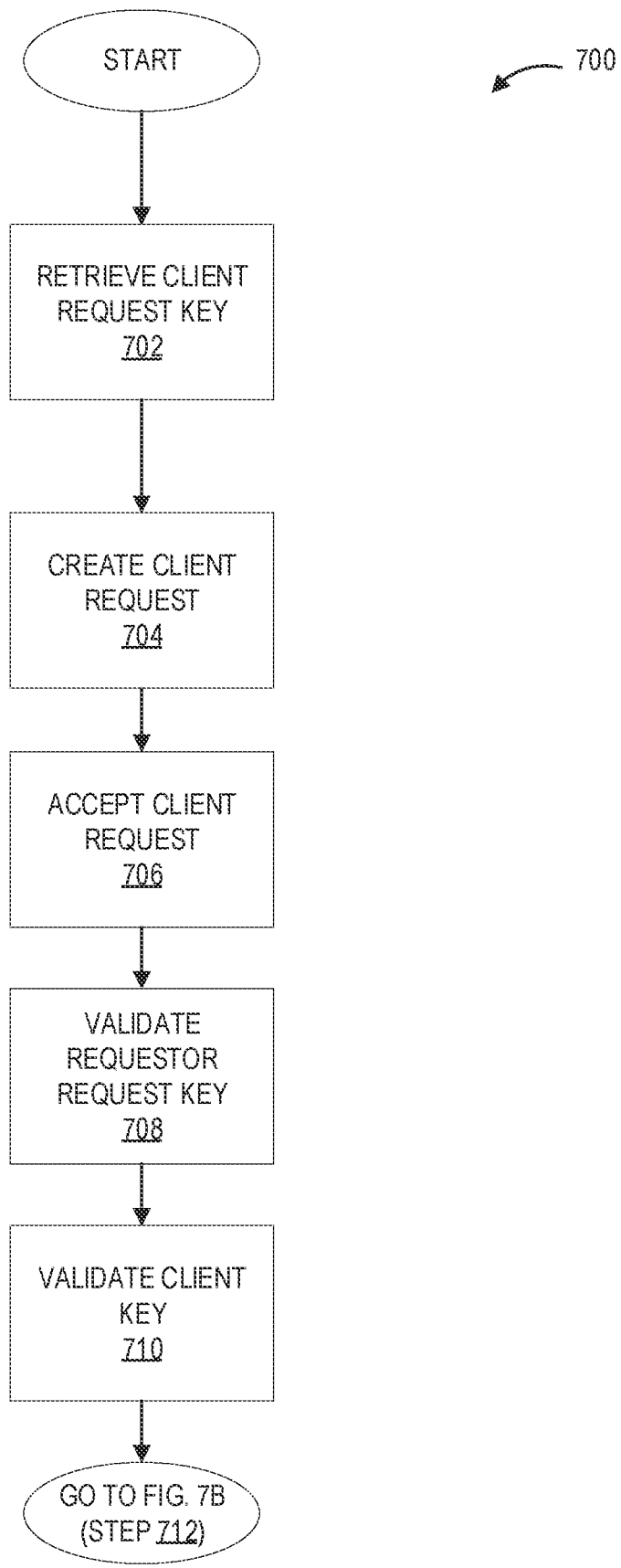
FIG. 7A illustrates an exemplary client-requestor data exchange process, according to one embodiment of the present disclosure.
Figure 7B:
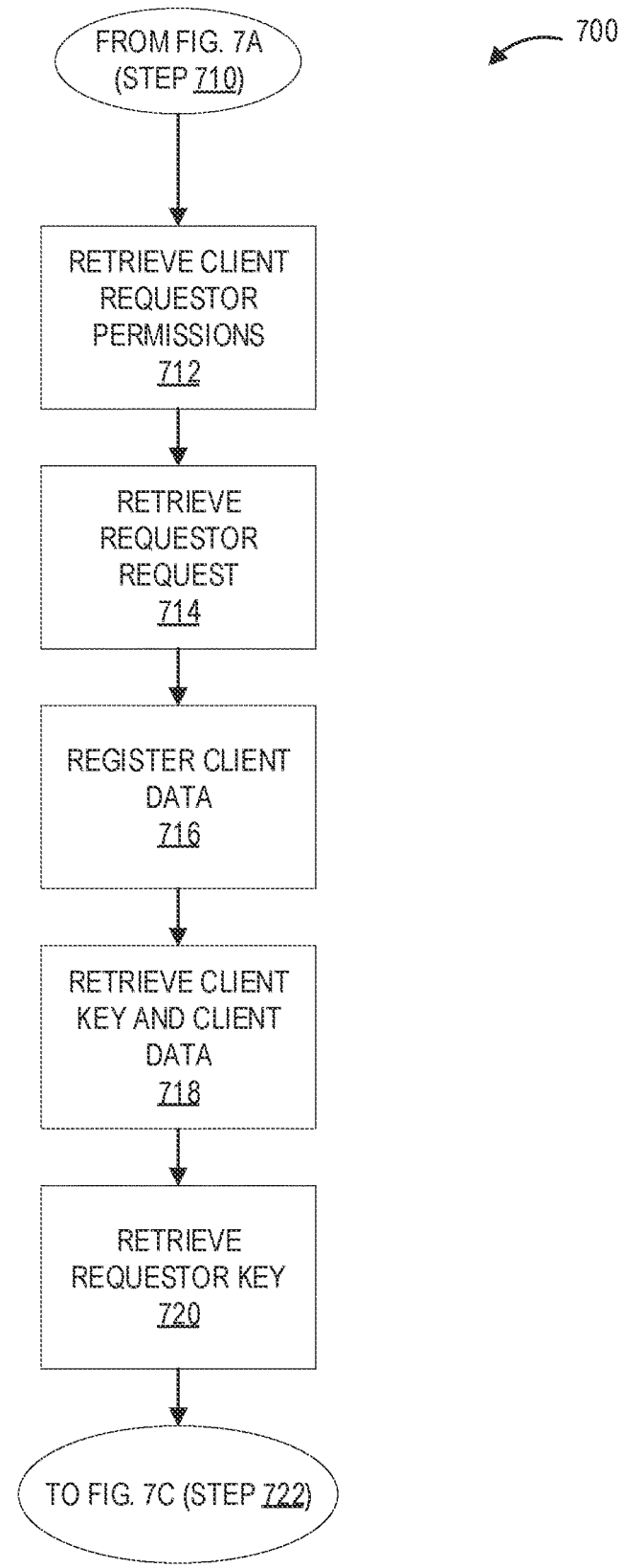
FIG. 7B illustrates an exemplary client-requestor data exchange process, according to one embodiment of the present disclosure.
Figure 7C:
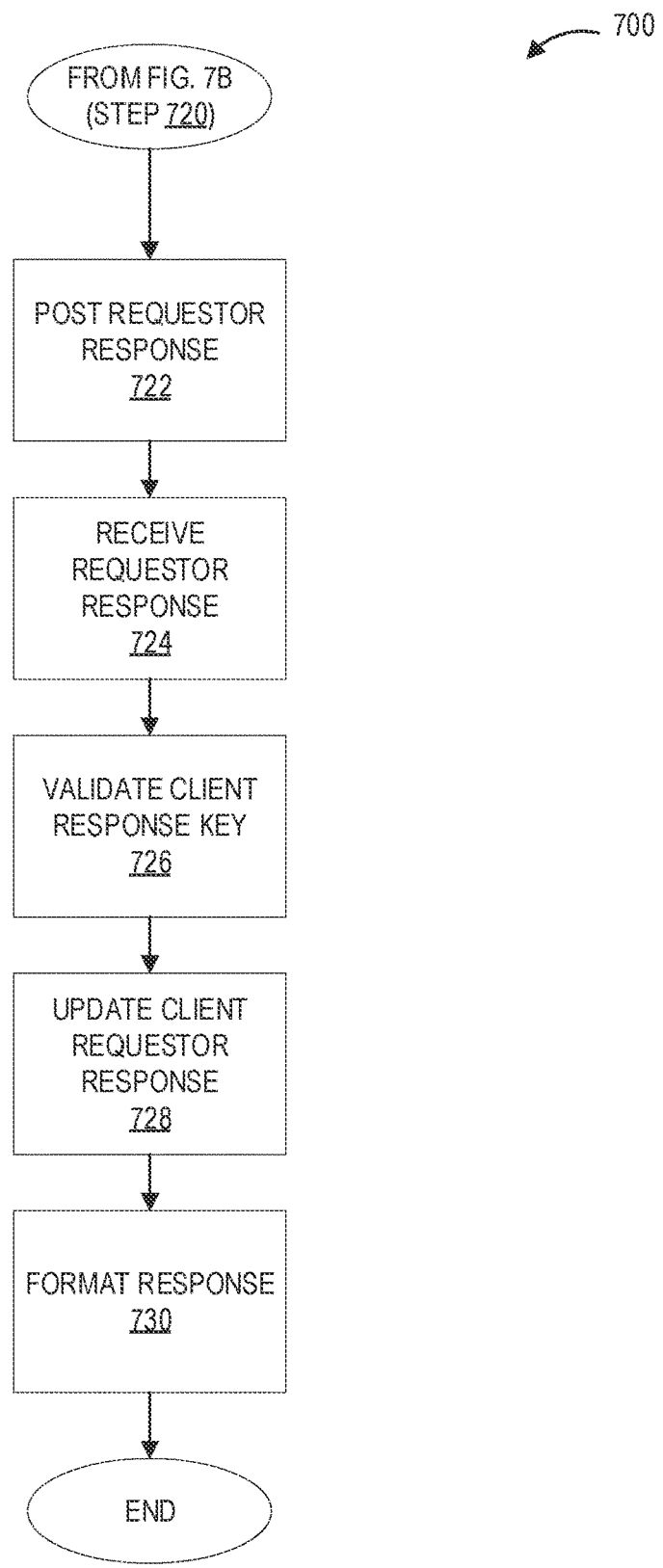
FIG. 7C illustrates an exemplary client-requestor data exchange process, according to one embodiment of the present disclosure.

Turning now to FIGS. 7A-C, a flowchart of an exemplary client-requestor data exchange process 700 is described, according to one embodiment. In at least one embodiment, the client-requestor data exchange process 700 is the process in which the client adds client data to the client application 104 and allows a requestor to access the client data. In multiple embodiments, process 700 is the process by which a client may pass client data to the requestor. In one embodiment, a client may exchange data with a requestor while the requestor is registered through the broker application server 120. In one or more embodiments, clients may invite requestors to join the system 102 or may discover additional requestors.

In various embodiments, requestors may invite clients to perform client data exchanges. In one embodiment, a client that is registered to the broker application server 120 is able to exercise full access rights, or sensitivity levels, with the client data that is exchanged. In one or more embodiments, if a requestor sends a request for client data to a client who is not registered to the broker application server 120, the client is invited to download the client application 104 and register on the broker application server 120. In at least one embodiment, registering with the broker application server 120 may allow the client to exercise full control over client data being shared through the client application, as well as being provided with an active history of all client data sharing and requestor usage.

In multiple embodiments, process 700 describes the steps associated with receiving access to client data from a request for the client data. In one embodiment, a precursor to process 700 is that the client has registered the client data package (see process 400) that is exchanged and that the requestor has enough client details to contact the client and request data.

In some embodiments, requestors may request data in several ways, such as email, text message, push notifications, or other similar messaging methods, and a precursor to process 700 is that the client data is created and stored within the context of the client application 104.

In various embodiments, additional precursors for the process 700 may include, but are not limited to, the client providing the client data package, new clients utilize the client registration process (see FIG. 3), updates to client data previously exchanged with a requestor are treated as a new client data package, and/or validation of access takes place in the client data validation process. In one or more embodiments, clients may explicitly change the sensitivity level at a specific generation of client data packages and the client is given the option to cascade the sensitivity levels to all generations of client data packages. In some embodiments, if a client changes a sensitivity level or client data within a client data package, then the new client data package may be a new generation of the previous client data package, rather than a new client data package. In at least one embodiment, the sensitivity levels are applied to the generation 0 client data package, and new generations, by default, inherit the sensitivity level.

In multiple embodiments, all activities with the client data package are recorded to the client distributed ledger 174 for future reference. In one embodiment, any event that updates the generations of the client data package may also be written to the distributed ledger 174, which may include the client's options for updating sensitivity levels. In one or more embodiments, the distributed ledger 174 may act as the immutable record of all activity relating to the client data and client data access and client data sharing.

In multiple embodiments, at step 702 the requestor may receive the client key on the requestor application 180. In some embodiments, the broker application server 120 may first determine if the client exists. In many embodiments, if the client does not exist, the client registration subprocess 300 initiates for the new client. In one or more embodiments, once the client is registered, the client request key is created. In at least one embodiment, the client request key is generated by the client application 104 and anchors the request to create the client data package.

In multiple embodiments, step 702 generates a service request to the broker application server to retrieve the client request key. In one embodiment, the step may invoke a registration API getclientrequestkey.

In multiple embodiments, the service request may return to the requestor, via the requestor application 180, the client request key, which the requestor can use to request data from the client. In at least one embodiment, the key pairs are held on the broker application server 120 until the client accepts the requestor's request to exchange client data. In one or more embodiments, once the client accepts the requestor request, the client request key is published to the client's distributed ledger 174.

In some embodiments, the requestor record in the broker application server 120 may hold the log of requestor requests that have been initiated with the client request keys. In one embodiment, each key in the requestor log may hold a disposition of the request to allow the requestor to track request responses. In many embodiments, the disposition of the request may be a positive disposition, in which the client granted the requestor access to the requested client data, or a negative disposition, in which the client did not grant the requestor access to the requested client data.

In multiple embodiments, at step 702, the system 102 may retrieve the client key from the broker application server 120. In at least one embodiment, the client key within the broker application server 120 may match the client key stored within the client application 104. In one or more embodiments, the system 102 may also generate the client request key. In one embodiment, the requestor request key may be generated each instance a request for client data is generated by a requestor. In some embodiments, the client request key and the client key are sent to the requestor application 180 to establish the client request.

In multiple embodiments, the broker client registration database is part of the broker application server 120. In one embodiment, the broker client registration database serves a number of subject areas within the broker application server 120. In one or more embodiments, the broker client registration database stores registered information on client registration. In at least one embodiment, client registration may include, but is not limited to, client identification data, client data registration, and client package data registration.

In various embodiments, the broker client registration database manages relationships between core data elements in the broker application server 120. In some embodiments, the core data elements may include information that defines the client and the requestor within a client data exchange. In one embodiment, the relationships between the core data elements are used to create keys for the requestor requests and client requests and responses.

In some embodiments, the broker database manages the operational data for the broker application. In one embodiment, all client transactional data is stored within the client's distributed ledger 174.

In several embodiments, at step 704, the broker application server 120 may send the client request key to the requestor application 180. In one embodiment, the requestor acting as a requestor may utilize the client request key to initiate a validated request for client data to the client. In at least one embodiment, examples of validated requests include, but are not limited to questionnaires or surveys, requests for freeform data such as a review, requests for elementized data through a predefined form, and other options or data formats created by the requestor. In multiple embodiments, system 102 may not store the requested client data on the broker application server 120, and the requestor may only receive the client data after the client has authorized the client data exchange.

In various embodiments, on the requestor application, services may be used to manage the request, including, but not limited to, createclientdatarequest, createclientrequestform, and updateclientrequestform.

In at least one embodiment, the broker application server 120 may provide a service for the creation of requested client data, such as a third party service used to create surveys, form data, or other similar services to gather input data.

In some embodiments, the requestor application 180 may provide the ability to save work in progress (wip) copies of requests for client data on the requestor application 180 to be revisited later.

In multiple embodiments, at step 706, once the request has been completed and formatted, the requestor completes the request in the requestor application 180. In one embodiment, once completed, the requestor may signal to the broker application server 120 that the request has been completed and is ready for delivery to the client. In one or more embodiments, prior to accepting the request, the broker application server 120 may perform a validity check on the request. In at least one embodiment, the validity check may involve, but is not limited to, confirmation that the requestor is authorized to make the request, that the client request key is still valid, and/or that the request is properly formatted.

In some embodiments, requests between requestor application 180 and broker application server 120, and all requests between broker application server 120 and the client application 104, are asynchronous using a publish-subscribe pattern for the sending of messages. In one embodiment, the requests are transmitted via secure connection. In one or more embodiments, the use of an asynchronous mechanism allows for guaranteed and delayed delivery of requests.

In several embodiments, at step 708, the broker application server 120 may validate the requestor request key passed with the request. In some embodiments, the validation of the requestor request key may include validating whether the requestor has permission to send a request to a particular client. For example, in many embodiments, a client may block a particular requestor from sending the client requests for client data. In this example, in at least one embodiment, the system 102 would not validate the requestor request because the requestor does not have permission to send a request to this particular client. In one embodiment, the requestor request key may include the following information "<<requestorid,client request key>>". In many embodiments, the requestor application 180 transmits the allocated requestor request key from the requestor application 180 to the broker application server 120.

In multiple embodiments, the system 102 determines the result of the previous step and acts based on the result. In one embodiment, if the request is valid, the next validation step may take place, but if the request is invalid, the request is rejected, and the requestor notified of the error or rejection.

In various embodiments, the requestor access attempt and result are logged on the broker application server 120. In one embodiment, if the requestor request key is valid but access is not granted to the requestor by the client, then the client is notified of the access intent and is able to decide the appropriate response (i.e., allow the attempt and update the requestor access, or deny the attempt). In at least one embodiment, if the requestor access is denied due to access rights, the client is notified, and the access attempt is logged in the broker application server 120. In many embodiments, depending on the sensitivity level of the requested client data, the access attempt may also be logged to the client distributed ledger 174.

In some embodiments, in step 710, if the requestor request key is validated, the system 102 next validates the client key. In one embodiment, to perform the validation of the client key, the broker application server 120 may access the client access cache 108 to retrieve the latest validation rules that apply to the client. In at least one embodiment, the latest validation rules may include, but are not limited to client number, current client request data key, and current client data package key.

In multiple embodiments, the system 102 evaluates the validation rules to determine whether the requestor request is valid. In some embodiments, if the requestor request is valid, processing is transferred to the next step on the broker application server 120. In at least one embodiment, if the requestor request is invalid, the requestor request is rejected. In one embodiment, once the requestor request is determined to be valid, the system 102 goes to step 712.

In various embodiments, at step 712, once validation of the requestor request key and the client key have occurred, the sensitivity levels for the requestor and the client data package are retrieved from the broker application server cache on the broker application server 120 to determine whether the requestor has permission to transmit a request to the client. In many embodiments, sensitivity levels may have been previously established by the client for certain client data packages. For example, in one embodiment, a client may have "blocked" a specific requestor from requesting access to client data from the client by increasing the sensitivity level for the requestor such that the requestor may not send a request to the client. In at least one embodiment, the previously established sensitivity levels may be associated with the new generation of client data packages being validated. In some embodiments, the system 102 may compare the sensitivity level established by the client for the client data package against the access intent of the requestor request. In one or more embodiments, if the requestor is allowed to transmit a request to a client (e.g., the client has previously granted permission to the requestor to send the client requests), the system 102 may generate a broker key and send the broker key along with the request to indicate to the client application 104 that the request is valid.

In multiple embodiments, once the validation has taken place and all criteria have been met, the requestor request is formatted for logging. In at least one embodiment, the requestor request is formatted using a formatted request. In various embodiments, the formatted request is posted to the broker application server 120 and is passed to the distributed ledger 174 to record the request event.

In many embodiments, at step 714, the client application 104 retrieves the requestor request from the broker application server 120. In one embodiment, each registered client to the broker application may have an active subscription for a transaction queue on the broker application server 120 that serves to capture and post requests from the requestor, as well as to capture and post responses from the client. In one or more embodiments, access to the transaction queue is via secure web service calls.

In various embodiments, at step 716, the system 102 determines whether previously registered client data can satisfy the requestor request. In one embodiment, the client application 104 may display created client data packages to the client. In one or more embodiments, if the client has updated an existing client data package, the new, updated client data package is added as a new generation.

In some embodiments, if the data request requires a new client data package, the client may create the new client data package, so that the new client data package is registered using the existing registration process for client data packages.

In multiple embodiments, when a new client request is received, and a new client data package is created, a new version of the metadata for the new client data package is generated for the requestor request. In one embodiment, the new version of the metadata may describe the value data being returned with the response to the requestor. In one or more embodiments, when the client updates an existing client data package, new metadata may not be required. In at least one embodiment, the header for the client data package metadata is as follows:
<client data package key><client identifier><current generation root generation><creation data>

In various embodiments, at step 718, to satisfy the new client request and to validate the authenticity of the client request, the client key for the client data package that is to be transmitted to the requestor application 180 is pulled directly from the broker application server client database. In one embodiment, the broker application server client database is encrypted and is accessed only via a data access layer. In some embodiments, the system 102 returns the client key in response and is marshalled in the client access cache 108.

In some embodiments, once the system validates the client request, the client application 104 formats the client data to be sent to the requestor based on the schema described in the client data package metadata. In at least one embodiment, the client application 104 may encrypt and transmit the client data by value to the requestor application 180. In many embodiments, information regarding packet size of the client data being sent is kept and recorded in the client distributed ledger 174. In one embodiment, the packet size of the client data may also acts as a check for the requestor when the client data is returned in the response. In one or more embodiments, the system 102 may check the packet size against an expected packet size.

In one or more embodiments, the client application 104 encrypts the client data package and signs the client data package with a public asymmetric key before sending to the requestor application 180. In at least one embodiment, the requestor application 180 may decrypt the client data package upon retrieval. In one or more embodiments, the client data package does not materialize in the broker application server 120, only the client data package reference is stored on the broker application server 120.

In multiple embodiments, at step 720, the system 102 retrieves the requestor key from the initial request. In one embodiment, once the client application 104 obtains the requestor key, the client application 104 builds the requestor response from the requestor key, client key, client data package, the metadata from the response, and the actual data in the body of the message.

In various embodiments, at step 722, after the client application 104 creates the requestor response, the client application 104 posts the requestor response onto the broker application server 120 by using the client transaction queue on the client application 104 and setting the requestor response.

In some embodiments, if the client is sending an update to the requestor without a request (as may be the case when a permission changes or the core data changes), the update is posted to the broker application server and the requestor via a messaging mechanism. In one embodiments, the posting of any message within the broker application server 120 utilizes secure transport protocols only.

In multiple embodiments, at step 724, the broker application server 120 may include a listener that listens for requests and responses for both the client and the requestor. In at least one embodiment, the broker application server 120 listens for a requestor response from the client application 104 to process and pass through to the requestor application 180. In one embodiment, the broker application server 120 may log all activity that comes into the application, including, but not limited to, the following data:
<caller><responder><origin time><broker receipt time><broker dispatch to responder time><message size>

In some embodiments, the broker application server 120 may assign a client response key to be passed to the requestor application 180, which is a reference key that can be used to track the transaction and response. In one embodiment, the broker application server 120 may generate a client response key as a random key and may form part of the requestor response. In one or more embodiments, the broker application server 120 may transmit the client response key asynchronously to the client application 104 for reference. In at least one embodiment, the client response key acts as an acknowledgment of receipt of the requestor response. In some embodiments, where higher sensitivity levels are utilized, this client response key is utilized to track the usage and receipt of the client data by the requestor. In one embodiment, the client response key forms part of the verification of the trust relationship between the requestor and the responding client.

In multiple embodiments, at step 726, the broker application server 120 may validate the client response key against what was sent from the client before posting the message to the requestor. In one or more embodiments, if the client response key is valid, the requestor response is posted to a requestor response queue. In one embodiment, if the client response key is not valid, the requestor response may not be posted, but is held for investigation and validation by the broker application support.

In various embodiments, the system 102 may retrieve the requestor response from the requestor response queue and load the requestor response into a client requestor response cache. In one embodiment, the full content of the message may be decrypted, and the values exposed to the requestor. In some embodiments, if the message is a change of sensitivity level, the body of the message may contain no values, but the client request key, the client response key, the requestor request key, and the requestor response key may remain in memory with a pointer to the value data that was sent with the client data package.

In some embodiments, changes to sensitivity level are stored in memory, and the requestor application 180, based on the changes to sensitivity level, determines the actions to take with the shared client data.

In multiple embodiments, at step 728, the system 102 may update the client requestor response key in memory for the client data package. In some embodiments, the client response key generated by the broker application server 120 is updated with the client data package information. In one embodiment, the client response key and the client data package key may be used to validate the version of the client data that has been sent to the requestor for higher sensitivity levels.

In many embodiments, in step 730, the system 102 evaluates the sensitivity level, and, based on the sensitivity level, formats the client data for display on the requestor application 180.

In various embodiments, if sensitivity levels have been increased, the requestor application 180 may honor the trust parameters prior to materializing the data. In at least one embodiment, honoring the trust parameters prior to materializing the data may include, but is not limited to, non-sharing of data, limited sharing of data, revocation of access, removal of restriction on sharing of data, and limiting copying of data.

Figure 8A:
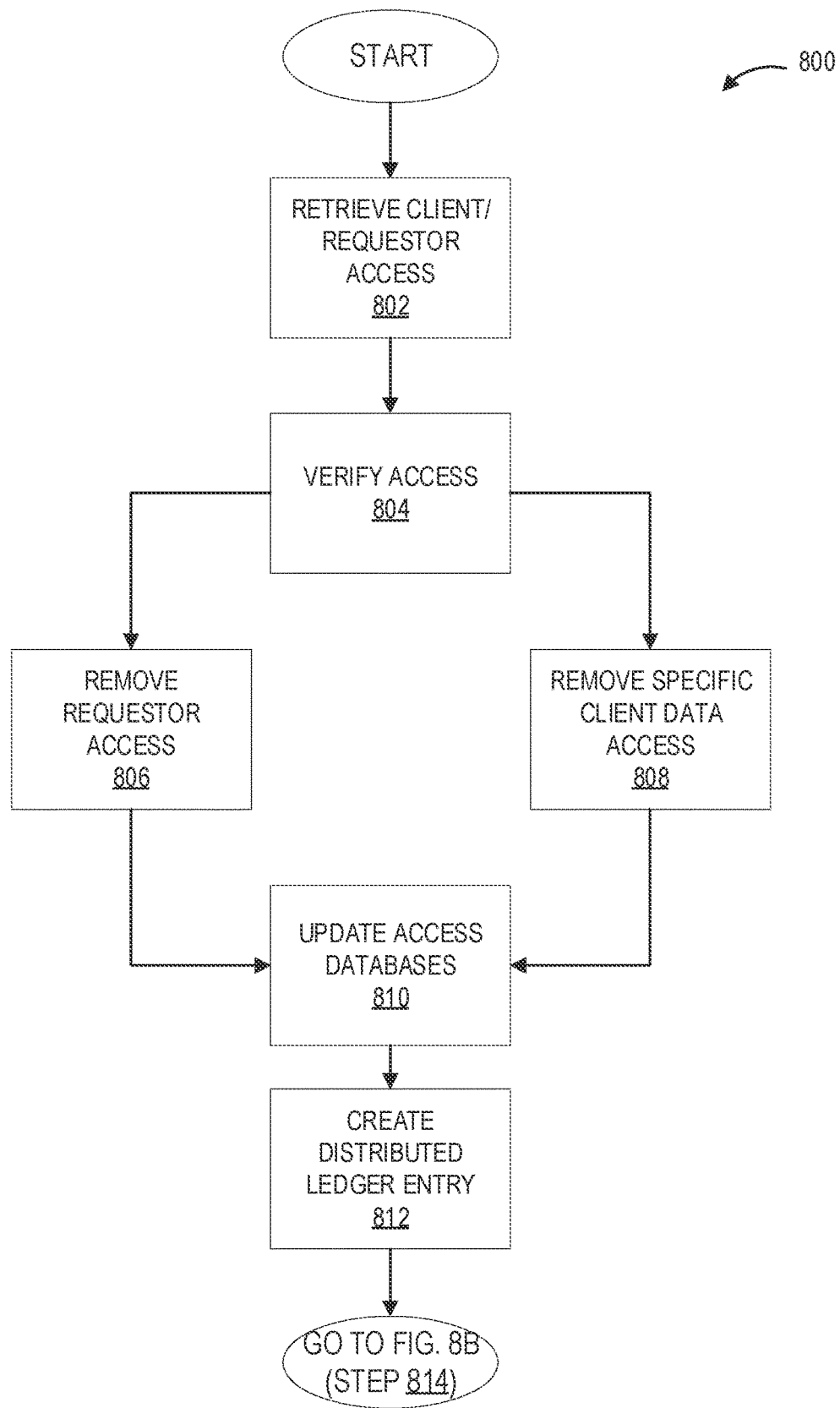
FIG. 8A illustrates an exemplary requestor access removal process, according to one embodiment of the present disclosure.
Figure 8B:
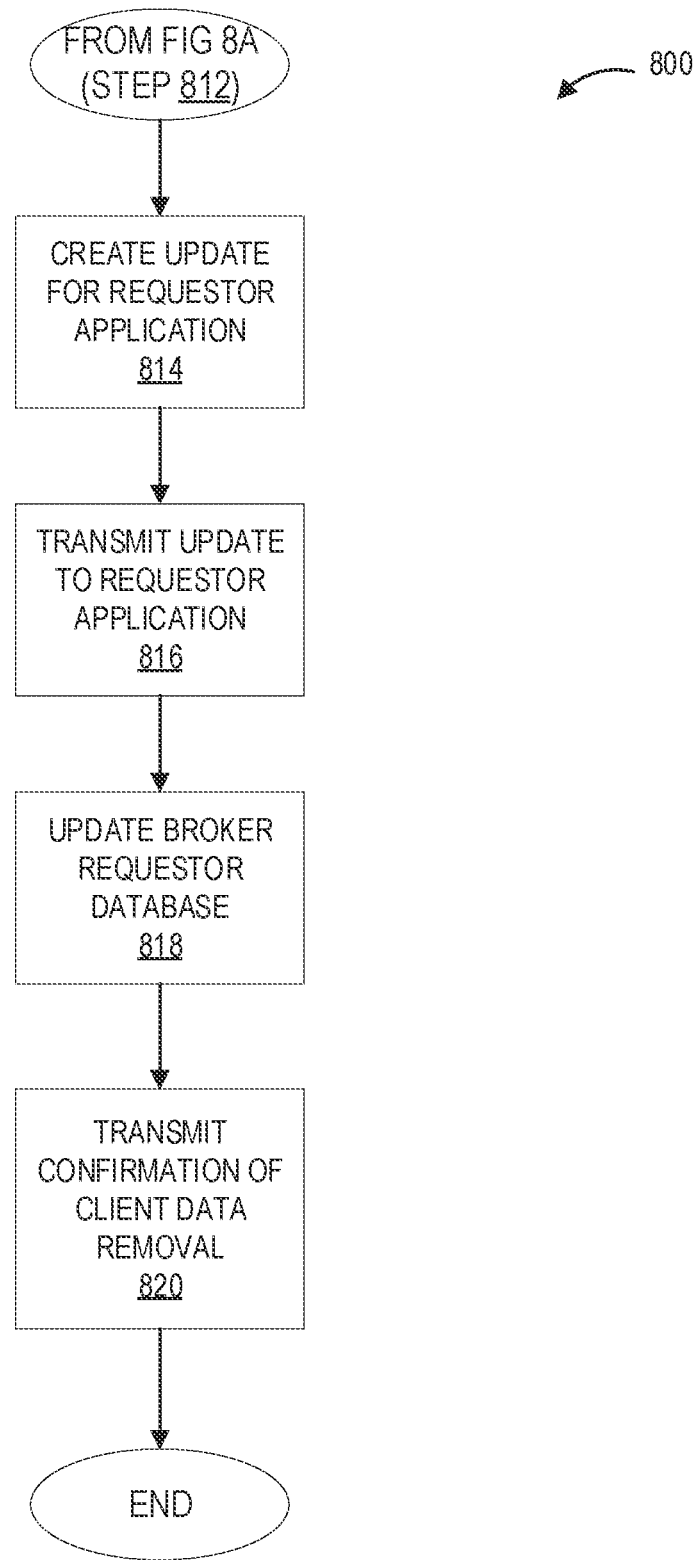
FIG. 8B illustrates an exemplary requestor access removal process, according to one embodiment of the present disclosure.

Turning to FIGS. 8A-B, a flowchart of an exemplary requestor access removal process 800 is described, according to one embodiment of the present disclosure. In some embodiments, the requestor access removal process 800 is the process in which the client removes the requestor's access to the client data. In various embodiments, process 800 may show how requestor access to client data is removed through the broker application. In one embodiment, process 800 is similar to the add process 700 but differs in that the requestor access already exists.

In some embodiments, in process 800, the client, via the client application 104, removes access from a requestor. For example, in one or more embodiments, the client may wish to remove all references to the previously exchanged client data. In many embodiments, these references to the previously exchanged client data may be pointers to the previously shared elements. In one embodiment, the system 102 may delete these references and replace the references with low value keys (null values) so that the system 102 reads these references as invalid. In at least one embodiment, the client may only want to remove access from the requestor for some shared client data without the need to remove access to all previously shared data.

In some embodiments, at step 802, after the client identifies the exchange of client data between the client and requestor to be removed, the system 102 may retrieve the current client/requestor access permissions. In one embodiment, the client may remove access from the requestor completely, which may occur when the client no longer wishes to exchange information with a particular requestor. In a further embodiment, the client application 104 or the broker application may allow the client to blacklist a specific requestor from making further requests. In at least one embodiment, the client may selectively remove access from a particular requestor, by deciding what particular, previously shared client data the client no longer wishes to share with a particular requestor. In one or more embodiments, the impact of revoking access from a particular requestor may have different outcomes based on sensitivity level.

In various embodiments, the client may, via a user interface on the client device, toggle which particular data elements the client allows a requestor to see. For example, in one embodiment, the client may toggle the button for "client email address" off for a specific requestor, so that the system 102 no longer allows the specific requestor from accessing the client email address data element.

In multiple embodiments, the client may initiate step 802 through the client application 104. In at least one embodiment, in an offline scenario, a client/requestor access list may come directly from the client application 104, while in a connected mode the broker application server 120 may provide the client/requestor access list to the client through an API or other communication operation, such as the getrequestoraccesslist API in the broker application server 120. In one or more embodiments, the client/requestor access list is a list of which requestors have access to which client data packages. In one embodiment, if the broker application server falters, the client and requestor may still exchange information due to the client/requestor access list. In some embodiments, if a client application falters, or a requestor application falters, the system 102 may utilize the client/requestor access list to recover the accesses for either the client or requestor.

In various embodiments, the client/requestor access list is stored on the broker application server 120, which provides recoverability as well as consistency should the client need to recreate the client application database.

In multiple embodiments, at step 804, the client is presented with a list of known accesses from the broker application server 120 and may verify the client/requestor access list of requestors and accesses. In at least one embodiment, the broker application server 120 may provide details of the requestor access to the client application 104 via a summary and detail display.

In various embodiments, in addition to verifying the list of accesses, the client may view the client records on the distributed ledger 174 for activity previously associated with the requestor access. In some embodiments, in verifying the requestor access, the client may view the generations of client data packages that were exchanged with the requestor. In one or more embodiments, during step 804, the client may focus on a single requestor through selection.

In several embodiments, the system 102 may receive an input from the client regarding a specific removal process to initiate. In many embodiments, the client may view, on the client application 104, a list of requestors and accesses and may remove access to all client for a particular requestor (step 806), or may remove access to a particular client data package for all requestors (step 808). In some embodiments, prior to removing access, the system 102 may cause the client to confirm the access is correct or that the requestor is the correct requestor.

In various embodiments, the history of activity with the requestor may remain in the client distributed ledger 174 as a ledger of activity. In one or more embodiments, depending on the sensitivity level associated with the client data exchanged with the requestor, the requestor may lose access to the shared client data. For example, in one embodiment, if a client data package includes a low sensitivity level (e.g., '0'), the requestor may not lose access because the client data within the client data package may not be protected by the revocation rules.

In multiple embodiments, at step 806, the client may dispose of all client data previously shared with a particular requestor, irrespective of individual sensitivity levels for the previously shared client data. In one embodiment, other requestors that have access to the client data may still have access to the client data after the system removes access to the client data for a particular requestor, and the client data may continue to have the assigned sensitivity level. In at least one embodiment, in the event the client wishes to perform a cascaded deletion of all client data, the system 102 may override the assigned sensitivity levels for the client data. In some embodiments, a cascaded deletion may revoke all client data across all sensitivity levels for all requestors.

In many embodiments, if the client wishes to delete the requestor entirely, the system 102 may update the client/requestor access list on the broker application server 120 and on the client application 104. In some embodiments, the requestor request key for the deleted requestor in the broker application server 120 may update to low values to identify that no relationship now exists between the client and the deleted requestor.

In some embodiments, at step 808, the client may select specific client data accesses to remove from a requestor, a plurality of requestors, or all requestors. In many embodiments, the client may remove access to any one of the client data packages. In one embodiment, the client may view a list of all client data packages together with the associated description and sensitivity level. In one or more embodiments, the system 102 removes access to the specific client data by updating the requestor request key or client data package key to low values for the specific client data package access, indicating that either key is no longer valid, thus removing access to the specific client data.

In several embodiments, once the client has selected a particular client data package to remove access from, the system 102 may update the requestor permissions list on the client application 104 and update the requestor key to low values on the broker application server 120 to identify that no relationship exists between the particular client data package and the requestor.

In various embodiments, at step 810, the system 102 may update the client/requestor access list on the client application 104 and the broker application server 120 to show changes for the client data accesses for each requestor, and to show all requestors that may access each client data package.

In multiple embodiments, the broker client access database updates to show the removal of client data access for a requestor, or to show the removal of access of one or more requestors for a particular client data package. In one or more embodiments, the system 102 may update the client permissions list and the process for the client data access removal takes place on the broker application server 120 and the requestor application 180.

In various embodiments, at step 812, the system 102 creates an entry on the client distributed ledger 174 to document the removal activity. In one embodiment, the entry to document the removal activity is created on the broker application server 120 and passed through the interface to the distributed ledger fabric 170. In at least one embodiment, the entry remains in the client distributed ledger 174 permanently.

In multiple embodiments, at step 814, the system 102 may transmit the update to the requestor application 180. In some embodiments, the system 102 updates the client requestor permissions on the requestor application 180. In one or more embodiments, the system 102 may update the client requestor permissions to remove the requestor. In at least one embodiment, to remove the requestor, the broker application server 120 may update the client reference in the requestor permissions database to a low value or null value, which removes the requestor's access to the client data. In one embodiment, the broker application server 120 may also remove all storage references to the client data on the requestor permissions database, which removes the client data. In many embodiments, after the broker application server 120 removes the client reference in the requestor permissions database, the requestor application 180 may update the requestor access cache 184, which removes the client references from the requestor access cache 184 so that the requestor may not access the client data. In one or more embodiments, if the client elects to remove the client data, then the requestor application 180 may remove all storage reference data of the client data from the requestor application 180 so that the storage reference data no longer points to the client data.

In various embodiments, at step 816, the broker application server transmits the update to the requestor application 180 and updates the requestor access cache 184. In one embodiment, the update may be a removal request or an update access message. In many embodiments, if the client elects to remove or update access to specific data, the system 102 may update the client requestor permissions to remove or update access to specific data. In some embodiments, once the client elects to remove or update access to specific client data (i.e., the permissions are updated), the broker application server 120 may either format a message to update sensitivity level for the selected client data package or format a removal request for the requestor application 180 to remove access to the client data package. In one or more embodiments, when a message is received from the broker application server 120 to remove or update the client data package permission, the requestor application 180 evaluates the current trust setting and updates the requestor permission cache with the new sensitivity level. In at least one embodiment, if the request is for removal of permissions to a client data package, the requestor application 180 evaluates the assigned permissions to determine the actions associated with the removal.

In some embodiments, at step 818, once the system 102 updates the requestor access cache 184, the broker requestor application database 192 is updated. In one embodiment, the requestor access cache 184 holds all valid client permissions, and messages or signals from the broker application server 120 are processed to the requestor access cache 184 for immediate action. In one or more embodiments, processing to the requestor access cache 184 ensures that any subsequent requests for access to the client data may only honor the permissions in requestor access cache 184.

In multiple embodiments, the requestor application 180 utilizes a requestor access cache offload mechanism to update the broker requestor application database 192 with the current update to the active requestor access cache 184. In one embodiment, the requestor access cache offload mechanism may ensure that the update is performed within a single unit of recovery. In one or more embodiments, should a failure occur in writing to the requestor access cache 184 or the database, the message is replayed at the requestor access cache 184 until the message is successfully applied in both the requestor access cache 184 and the broker requestor application database 192. In various embodiments, the system 102 ensures integrity of the client permissions and of the client data that is protected by these permissions by immediately updating the requestor access cache 184 and the broker requestor application database 192.

In multiple embodiments, at step 820, once the client data removal process has been successfully processed on the requestor application 180 and broker application server 120, a post confirmation message is sent back to the broker application server 120 to signal the completion of the client data removal process. In at least one embodiment, the requestor application 180 may post this confirmation message asynchronously to the broker application server 120. In one or more embodiments, the post confirmation message may contain the following content:
<client key><requestor key><client data package key><generation number (optional)<requested operation><executed operation><before sensitivity level><after sensitivity level><execution date><operation status>

In various embodiments, the broker application server 120 posts the confirmation message in the broker access log. In one or more embodiments, the client distributed ledger entry has already been created, therefore the final log entry for the process may reside on the broker application server 120 and process 800 is completed.

Key Generation

In multiple embodiments, during the generation of the keys by the broker application server keystore, the system 102 may invoke the key management service 144 of the broker application server 120 to generate unique keys for the client and requestor. In one or more embodiments, the key management process utilizes a symmetric key generation pattern to create both the client and requestor keys.

In some embodiments, the key generation process occurs within the broker application server 120. In one embodiment, the client application 104 and requestor application 180 may only generate response keys to requests.

In some embodiments, the broker application server 120 generates either a random key for some requests, or, for certain functions, an intelligent key. In one or more embodiments, any key that is not a random key may be an intelligent key. In many embodiments, an intelligent key may include some information or direction embedded therein, such as a concatenation of other keys (e.g., client keys, client data package keys, requestor request keys, etc.). In at least one embodiment, the intelligent key may provide some intelligence as to the source and/or storage location of the data included in the intelligent key.

In various embodiments, the generation of the keys utilizes a key factory pattern for the generation of the unique keys. In one or more embodiments, the key factory pattern may generate both random and intelligent keys. In at least one embodiment, a key may be generated by calling one of the following services: getrandomkey and/or getclientkey. In one embodiment, the keys may be a "bigint" type key, an "int" type key, or a "smallint" type key. In some embodiments, "bigint", "int", and "smallint" refer to data type stores for a range of integers, as one in the art would understand.

In multiple embodiments, the client key is a unique identifier for the client and is a "bigint" type key. In at least one embodiment, the requestor key is a unique identifier for the requestor and is a "bigint" type key. In one or more embodiments, the client data is a unique identifier for an item of client data and is an "int" type key. In some embodiments, the client data package key is a unique client data package key and is an "int" type key, but may also be used in the generation of the client data package as a "smallint" type key. In one embodiment, the client request key is a randomly generated key from the broker application server 120 that is associated with the request to the client, and is an "int" type key.

Additional Embodiments

In various embodiments, the methods and processes described herein may also include using a device-independent method for protecting the client data stored on any registered device of the client. In some embodiment, the device-independent method may be generally referred to as application data safe. In one or more embodiments, the device-independent method may be utilized by a client if the client uses a different client device rather than the client device that was used to create and store previously made client data. For example, in one embodiment, a client may have utilized the client application on an original device, and may have created client data and shared access to the client data with requestors. Continuing with the example, in many embodiments, the client may download the client application on a new device (e.g., upgrading device, original device destroyed, client uses multiple devices, etc.), and utilize the device-independent method to retrieve the client data from the original device and store the retrieved client data on the new device.

In some embodiments, the method of independently securing client data segments (also referred to herein as "client data packages") utilizes the client key and a client data segment key. In at least one embodiment, the client key is a unique key to the registered client and is allocated by the client application 104 during client registration. In one or more embodiments, half of the client key is stored on a client token, and the other half is stored on the registered client devices. In many embodiments, the client data segment key is stored with the client data segment and is passed with each authorized data segment passed to the requestor. In one embodiment, the client data segment key is stored locally with the client data segment and with the segment registration on the client distributed ledger record.

In multiple embodiments, the client identifies the client data segment that is to be registered. In at least one embodiment, the data segment is allocated within the client register and a temporary key is allocated to establish the sequence of the data segment. In one or more embodiments, the device may store the record of the data segment, device identification, and registration date within the client application 104. In some embodiments, once connected to the broker application server 120, the data segment registration data may be exchanged with the broker application server 120. In many embodiments, the broker application server 120 may generate a permanent client data segment key and may return the permanent client data segment key to the client as confirmation of generation. In one embodiment, the system 102 may store the client data segment key, the data segment registration, and the storage location together on the distributed ledger 174.

In one or more embodiments, the application data safe may be a composite of the primary client data segment storage device, the client data segment, and the client key.

In various embodiments, the client data is primarily available on the registered client's device, and may also be accessible through a logical structure (e.g., a cloud storage space) should the user move devices. In one or more embodiments, all access to protected client data segments utilizes the above key elements, and when a client accesses the client data segment via a registered alternate device, a location attribute is used to determine the route to the physical client data segment. In at least one embodiment, accessing the client data segment on another device is referred to as local data access.

In several embodiments, each client device registered to the application is provided with a unique identification from the client application 104, which is stored with the client key. In some embodiments, the device registration takes a unique identifier from the device, such as an EIN number for a mobile device, and stores the modified client key on the distributed ledger 174.

Figure 9A:
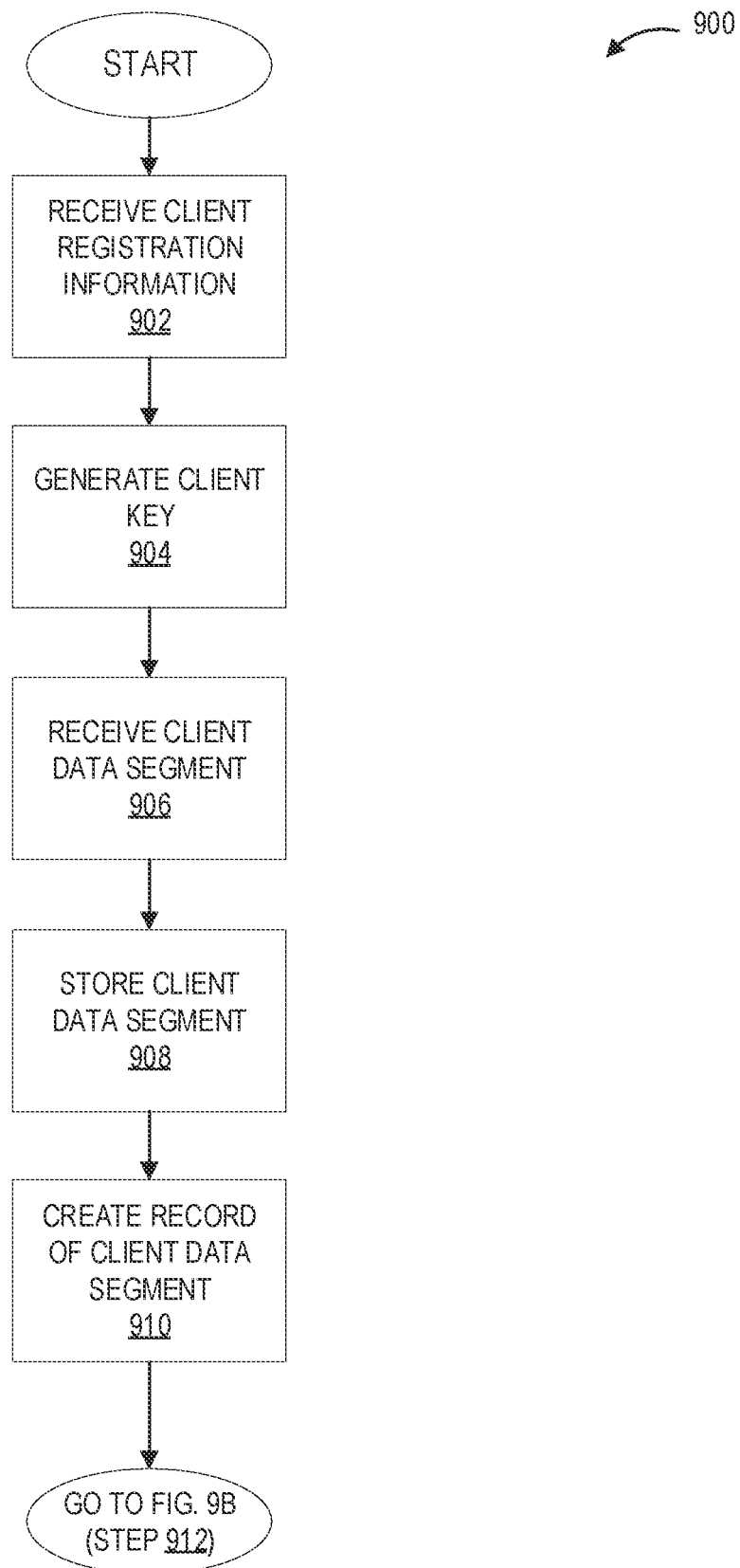
FIG. 9A illustrates an exemplary device-independent client data transfer process, according to one embodiment of the present disclosure.
Figure 9B:
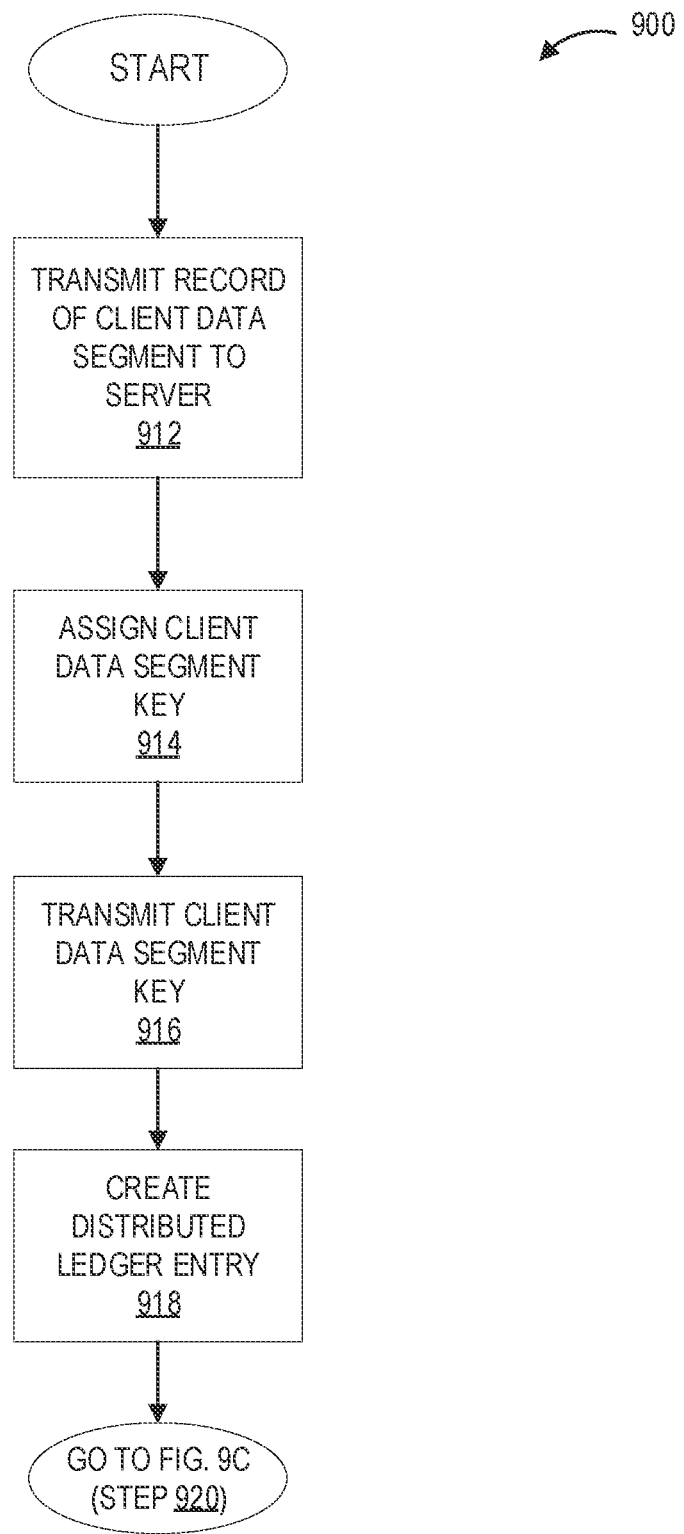
FIG. 9B illustrates an exemplary device-independent client data transfer process, according to one embodiment of the present disclosure.
Figure 9C:
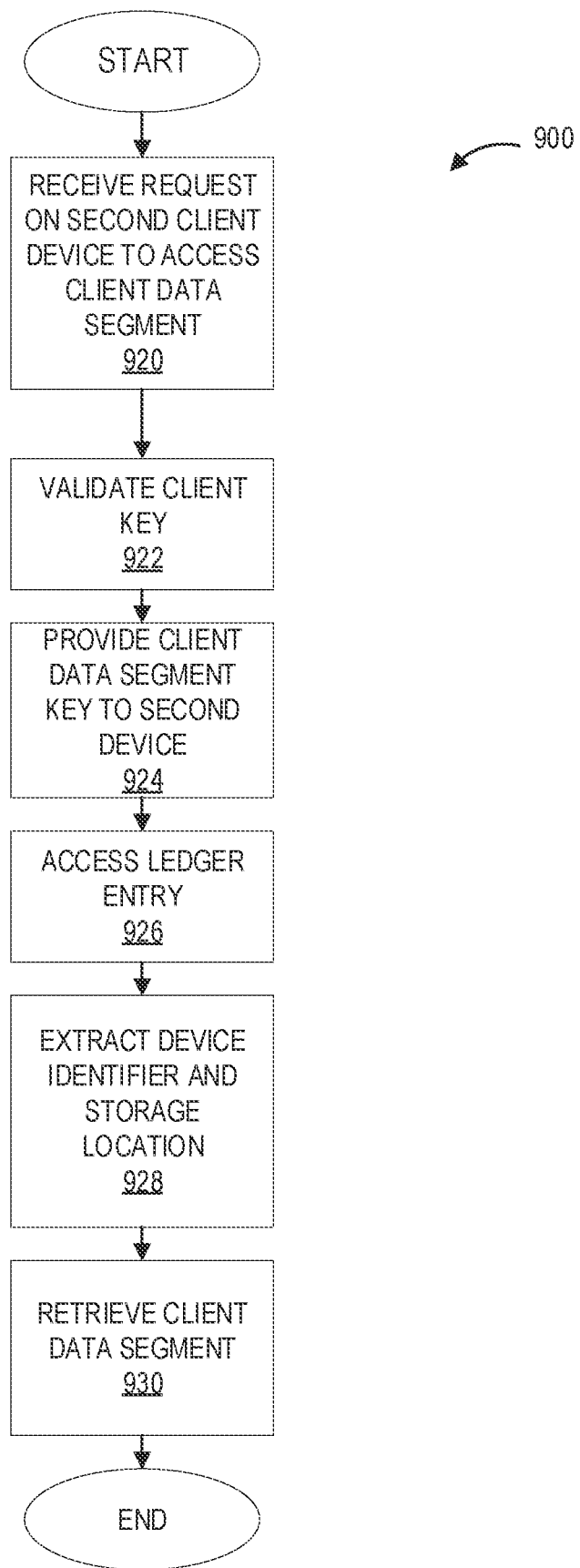
FIG. 9C illustrates an exemplary device-independent client data transfer process, according to one embodiment of the present disclosure.

Turning now to FIGS. 9A-C, an exemplary device-independent client data transfer process 900 is described, according to one embodiment of the present disclosure. In multiple embodiments, a client may utilize the process 900 to enable the continued use of the client application and associated client data and client data packages that were created and/or stored on a first device (also referred to herein an "original device" herein), on a second device (also referred to herein as a "new device"). In at least one embodiment, because the client data and client data packages are stored on the client device that was used to create the client data and client data packages, the client may transfer the client data and client data packages, via process 900, from the original client device to the new client device so that the client can retain active control over the already created client data and client data packages from the new device. In some embodiments, the client may utilize process 900 to transfer client data and client data packages to multiple additional client devices.

In various embodiments, at step 902, the system 102 may receive client registration information via the client application 104 on the original device. In at least one embodiment, the process of receiving and registering a client on a client application 104 is described in FIG. 3 and the accompanied description. For example, in one embodiment, the client may download the client application 104 on the client's mobile device, and register with the client application 104.

In many embodiments, at step 904, once the client registers with the client application 104, the system 102 may generate a client key associated with the client. In one or more embodiments, the client may have the same client key across any client device. In some embodiments, the process of generating a client key is described in the description of subprocess 300 and FIG. 3.

In several embodiments, at step 906, once the client has registered with the client application 104 on the client device and the client key has been generated, the system 102 may receive a client data segment associated with the client on the client device via the client application 104. In one or more embodiments, the client may input information into the client application 104 on the client device, which the client device receives as client data and a client data segment, or receives as client data and generates a client data segment based on the received client data.

In multiple embodiments, at step 908, the system 102 may store the client data segment in a database on the client device. In one or more embodiments, the database may be a storage space on the client device or a cloud-based storage space associated with the client. In some embodiments, the system 102 may generate and assign a temporary key to the client data segment until the client application 104 receives a client data segment key (see steps 914 and 916) from the broker application server 120. In one embodiment, the system 102 may utilize the temporary key to process and track the client data segment until the record of the client data segment is associated with the client data segment key and stored on the distributed ledger.

In at least one embodiment, at step 910, the system 102 may create a record of the client data segment on the client device. In some embodiments, the record may include a storage location of the client data segment on the client device and a client device identifier that corresponds to the client device. In one or more embodiments, a client device may be associated with only one client device identifier. In one embodiment, the storage location of the client data segment may be a pointer to the locating in the database where the client data segment is stored.

In various embodiments, at step 912, the system 102 may transmit the record of the client data segment to a server. In one or more embodiments, the server may be the broker application server 120. In some embodiments, the server may store the record of the client data segment in a database.

In many embodiments, at step 914, the system 102 may generate and assign a client data segment key to the client data segment at the server. In one embodiment, the client data segment key may anchor the client data segment when the client data segment is being shared with a requestor.

In several embodiments, at step 916, the system 102 may transmit the client data segment key from the server back to the original client device. In one embodiment, the system 102 may store the client data segment key on the client device. In at least one embodiment, the client data segment key may be utilized in validation processes for the client data segment.

In some embodiments, at step 918, the system 102, via the client application 104, may create a ledger entry on the distributed ledger 174 that corresponds with the client data segment. In many embodiments, the ledger entry may include the client data segment key and the record of the client data segment. In at least one embodiment, the client, by utilizing the client key, may access the ledger entry associated with the client data segment.

In one embodiment, steps 906-918 may be described further in process 400 (FIG. 4) and the accompanying description thereof.

In various embodiments, once the system 102 has created a ledger entry of the client data segment, the client may thereafter access and transfer the client data segment from the original device to a second device. In multiple embodiments, prior to accessing the client data segment on a second device, the client may register the client application 104 on the second client device. In some embodiments, once the client registers the client application 104 on the second client device, the client key for the client may be associated with the client application 104 on the second client device. In at least one embodiment, the system 102, when generating the client key for the second client device, may include a device identifier corresponding to the first client device and the second client device. In one embodiment, a portion of the client key may be associated with the first client device and the second client device, and may be stored on the first client device and the second client device, and another portion of the client key may be associated with the ledger entry on the distributed ledger.

In many embodiments, at step 920, once the client is registered with the client application 104 on the second client device, the client may request access to the client data segment that was created on and stored on the first client device. In at least one embodiment, the system 102 may receive a client request to access the client data segment from a second client device associated with the client. In one or more embodiments, the client request to access the previously created client data segment may be received via the client application 104 on the second client device. In some embodiments, the client request may include the client key associated with the client, as well as a selection of the client data segment to access. For example, in one embodiment, the client application 104 on the second client device may allow the client to view a list of client data segments that the client has created, both on the second client device and the first device (or multiple other devices), but the client, while using the second client device, may only access the client data segments stored on the second client device. Continuing with this example, in at least one embodiment, the client may select a client data segment to access, and if the client data segment is stored on the first client device and not the second client device, the client may request that the client application 104 transfer or retrieve the client data segment from the first device to the second client device, so that the client may access the client data segment on the second device.

In multiple embodiments, at step 922, the system 102 may validate the client key to authorize the client to access the client data segment. In some embodiments, the system 102 may validate the client key by checking the client key from the client application 104 on the second client device against the stored client key associated with the client data segment.

In several embodiments, at step 924, upon validation of the client key associated with the client application 104 on the second client device, the system 102 may provide the client data segment key to the client on the second client device.

In various embodiments, at step 926, once the client data segment key is provided to the client on the second client device, the system 102 may access the ledger entry corresponding with the client data segment on the distributed ledger 174 based on the client data segment key.

In many embodiments, at step 928, the system 102 may extract, from the ledger entry corresponding with the client data segment, the device identifier corresponding to the first client device (the client device where the client data segment is stored) and the storage location of the client data segment in the database on the first client device.

In one or more embodiments, the system 102 may thereafter retrieve the client data segment from the database on the first client device and transmit the client data segment to the client application 104 operating on the second client device. In one embodiment, once the client data segment is received at the second client device, the client may edit and allow requestors to access the client data segment from the second device. In at least one embodiment, the system 102 may thereafter store the client data segment in a database on the second client device as described in step 908 and create a record of the client data segment on the second client device as described in step 910, and additionally perform steps 912-918 for the client data segment stored on the second client device. In some embodiments, the client may utilize process 900 to retrieve the client data segment now stored on the second client device to a third client device.

In various embodiments, it will be appreciated that, though the description of the exemplary embodiment utilized two client devices, that there is no limit to the amount of client devices that may utilize this disclosed process.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multiprocessor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), wireless LANs (WLAN), and a cellular network that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method for managing data, comprising the steps of:
receiving a client data segment associated with a user of a client device via a client application operating on the client device, wherein a client key is associated with the user;
storing the client data segment in a database on the client device;
creating a record of the client data segment on the client device, the record including a storage location of the client data segment on the client device and a device identifier corresponding to the client device;
transmitting the record of the client data segment to a server;
assigning a client data segment key to the client data segment at the server;
transmitting the client data segment key from the server back to the client device;
creating, via the client application, a ledger entry corresponding to the client data segment on a distributed ledger associated with the user, the ledger entry including the client data segment key and the record of the client data segment, wherein the client key governs access to the distributed ledger.

2. The method of claim 1, further comprising the steps of, prior to receiving the client data segment associated with the user of the client device via the client application operating on the client device:
receiving registration information corresponding to the user of the client device via the client application; and
generating the client key associated with the user.

3. The method of claim 1, further comprising the steps of:
receiving a request on a second client device associated with the user for access to the client data segment, wherein the request is received via the client application operating on the second client device, the request including the client key associated with the user;

validating the client key to authorize the user to access the client data segment;

upon validation of the client key, providing the client data segment key to the user on the second client device;

accessing the ledger entry corresponding to the client data segment on the distributed ledger based on the client data segment key;

extracting, from the ledger entry, the device identifier corresponding to the client device and the storage location of the client data segment in the database on the client device; and retrieving the client data segment from the database on the client device to the client application operating on the second client device.

4. The method of claim 3, further comprising the steps of, prior to receiving the request on the second client device associated with the user for access to the client data segment:

receiving registration information corresponding to the user of the second client device via the client application; and assigning the client key associated with the user to the user of the second client device.

5. The method of claim 3, wherein the client key further comprises the device identifier corresponding to the client device and a second device identifier corresponding to the second client device.

6. The method of claim 1, wherein the client key is associated with and stored on the client device and second client device.

7. The method of claim 1, wherein a portion of the client key is associated with and stored on the client device and second client device, and another portion of the client key is associated with the ledger entry on the distributed ledger.

8. The method of claim 1, further comprising the step of, prior to storing the client data segment in the database on the client device, generating and assigning a temporary key to the client data segment until the client data segment key is received from the server.

9. The method of claim 8, wherein the temporary key is used to process and track the client data segment until the record of the client data segment is associated with the client data segment key and stored on the distributed ledger.

10. A system for managing data, comprising:

a client device associated with a user, wherein the client device is operating a client application, and wherein the client device includes a database; and a server in electronic communication with the client device;

wherein the client device is configured to:
receive a client data segment associated with the user of the client device, wherein a client key is associated with the user;
store the client data segment in the database on the client device;
create a record of the client data segment on the client device, the record including a storage location of the client data segment on the client device and a device identifier corresponding to the client device; and
transmit the record of the client data segment to the server;

wherein the server is configured to:
assign a client data segment key to the client data segment at the server; and
transmit the client data segment key from the server back to the client device;

wherein the client device is further configured to:
create, via the client application, a ledger entry corresponding to the client data segment on a distributed ledger associated with the user, the ledger entry including the client data segment key and the record of the client data segment, wherein the client key governs access to the distributed ledger.

11. The system of claim 10, wherein the client device is further configured to, prior to receiving the client data segment associated with the user of the client device via the client application operating on the client device:

receive registration information corresponding to the user of the client device via the client application; and
generate the client key associated with the user.

12. The system of claim 10, further comprising:

a second client device associated with the user, wherein the second client device is operating the client application, wherein the second client device is configured to:

receive a request on the second client device associated with the user for access to the client data segment, wherein the request is received via the client application operating on the second client device, the request including the client key associated with the user;

validate the client key to authorize the user to access the client data segment;

upon validation of the client key, provide the client data segment key to the user on the second client device;

access the ledger entry corresponding to the client data segment on the distributed ledger based on the client data segment key;

extract, from the ledger entry, the device identifier corresponding to the client device and the storage location of the client data segment in the database on the client device; and retrieve the client data segment from the database on the client device to the client application operating on the second client device.

13. The system of claim 12, wherein the second client device is further configured to, prior to receiving the request on the second client device associated with the user for access to the client data segment:

receive registration information corresponding to the user of the second client device via the client application; and assign the client key associated with the user to the user of the second client device.

14. The system of claim 12, wherein the client key further comprises the device identifier corresponding to the client device and a second device identifier corresponding to the second client device.

15. The system of claim 10, wherein the client key is associated with and stored on the client device and second client device.

16. The system of claim 10, wherein a portion of the client key is associated with and stored on the client device and second client device, and another portion of the client key is associated with the ledger entry on the distributed ledger.

17. The system of claim 10, wherein the client device is further configured to, prior to storing the client data segment in the database on the client device, generate and assign a temporary key to the client data segment until the client data segment key is received from the server.

18. The system of claim 17, wherein the temporary key is used to process and track the client data segment until the record of the client data segment is associated with the client data segment key and stored on the distributed ledger.

* * * * *